(12) United States Patent
Reid

(10) Patent No.: US 6,312,599 B1
(45) Date of Patent: Nov. 6, 2001

(54) METHOD OF USING WASTEWATER FLOW EQUALIZATION BASINS FOR MULTIPLE BIOLOGICAL TREATMENTS

(76) Inventor: John H. Reid, 6 River Oak Pl., Fredericksberg, VA (US) 22401

( * ) Notice: Subject to any disclaimer, the term of this patent is extended or adjusted under 35 U.S.C. 154(b) by 0 days.

(21) Appl. No.: 09/584,786

(22) Filed: Jun. 1, 2000

(51) Int. Cl.[7] ....................................... C02F 3/30
(52) U.S. Cl. .................. 210/605; 210/621; 210/624; 210/626; 210/903; 210/906
(58) Field of Search ................... 210/605, 621, 210/622, 624, 626, 630, 903, 906

(56) References Cited

U.S. PATENT DOCUMENTS

| | | |
|---|---|---|
| 3,980,577 | 9/1976 | Yall et al. . |
| 4,277,341 | 7/1981 | Wise et al. . |
| 4,663,044 * | 5/1987 | Goronszy ............................. 210/906 |
| 4,824,563 * | 4/1989 | Iwahori et al. ...................... 210/605 |
| 4,867,883 * | 9/1989 | Daigger et al. ...................... 210/630 |
| 4,917,805 | 4/1990 | Reid . |
| 5,266,200 * | 11/1993 | Reid .................................... 210/605 |
| 5,288,405 | 2/1994 | Lamb et al. . |
| 5,342,522 | 8/1994 | Marsman et al. . |
| 5,380,438 | 1/1995 | Nungesser . |
| 5,401,412 | 3/1995 | Yang et al. . |
| 5,447,633 | 9/1995 | Matsche et al. . |
| 5,480,548 | 1/1996 | Daigger et al. . |
| 5,545,325 * | 8/1996 | Hsu et al. ............................ 210/605 |
| 5,603,833 * | 2/1997 | Miller .................................. 210/626 |
| 5,611,927 | 3/1997 | Schmid . |
| 5,667,688 * | 9/1997 | Kerrn-Jespersen et al. ......... 210/605 |
| 5,733,456 * | 3/1998 | Okey et al. .......................... 210/605 |
| 5,792,355 * | 8/1998 | Desjardins ........................... 210/605 |
| 5,833,856 | 11/1998 | Liu et al. . |
| 5,853,589 | 12/1998 | Desjardins et al. . |
| 5,888,394 * | 3/1999 | Jan ...................................... 210/621 |
| 6,136,185 * | 10/2000 | Sheaffer .............................. 210/903 |

\* cited by examiner

Primary Examiner—Christopher Upton
(74) Attorney, Agent, or Firm—Marion P. Lelong

(57) ABSTRACT

One or more flow equalization basins or lagoons are utilized for performing hydrolysis of ATP as the first stage of biological phosphorus reduction, selective reduction of biological oxygen demand (BOD), deamination, and denitrification of nitrate and nitrite compounds, in addition to simultaneous flow equalization of wastewater produced by food processing operations on a 2-to-6-day schedule. The inflow half of a single basin or an entire first basin is operated on an anaerobic/anoxic basis. The outflow half of the single basin or an entire second basin, if present, is operated on an anoxic/aerobic basis. A downstream nitrification reactor is operated on an aerobic/anoxic basis or is operated exclusively on an aerobic basis if followed by an anoxic reactor. The treatment controllably utilizes the high BOD/TKN and BOD/TP ratios in the inflow to the initial basin and controllable and selectively usable mixed liquor recycles to achieve the first stage of biological phosphorus reduction and denitrification of nitrate and nitrite compounds. The result is that nitrification of only ammonia, produced by deamination, and the luxury uptake stage of phosphate ions by polyP bacteria must be done downstream of the basin or basins, termed FEB reactors herein.

42 Claims, 7 Drawing Sheets

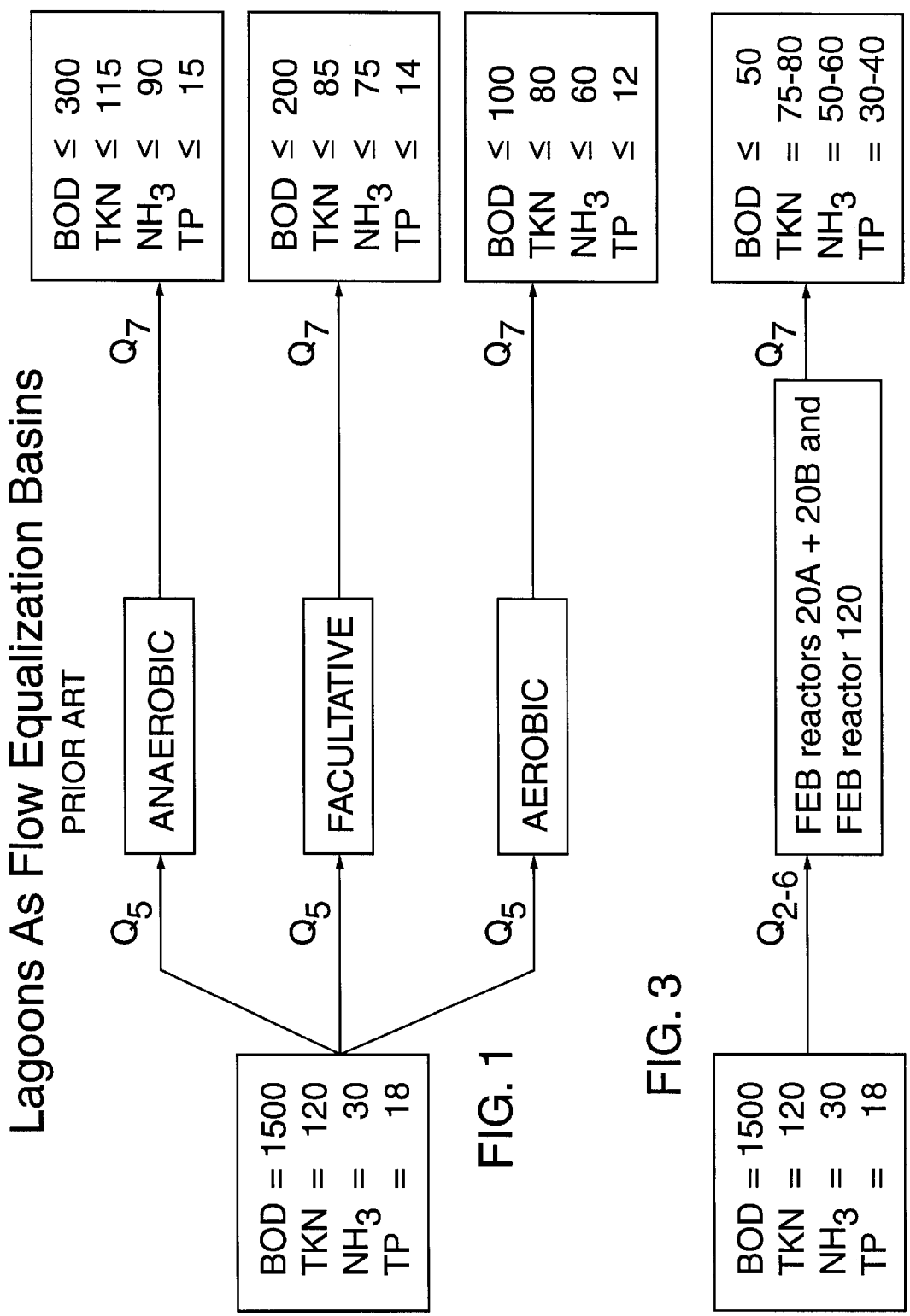

METHOD OF USING WASTEWATER FLOW EQUALIZATION BASINS FOR MULTIPLE BIOLOGICAL TREATMENTS

BACKGROUND OF THE INVENTION

1. Field of the Invention

This invention relates to treatment of wastewater produced during food processing operations. It specifically relates to utilizing at least one flow equalization lagoon or basin to perform a controlled hydrolysis stage of biological phosphorus removal, de-nitrification, and partial reduction of 5-day biological oxygen demand (BOD) during flow equalization of 2-to-6-day wastewater inflows to produce substantially uniform 7-day outflows, while maintaining high BOD/TKN and BOD/TP ratios within the influent wastewater of the basin or basins. It further relates to specific recycling steps and a plurality of control methods for maintaining satisfactory anaerobic, anoxic, and aerobic conditions at specific stages of this treatment and at all seasons of the year.

2. Review of the Prior Art

Wastewater treatment, both municipal and industrial, has focussed for years on removal of fats, oil, and grease, suspended solids, and biological oxygen demand (BOD) from wastewater produced by meat processing and other food processing plants, so that lakes and streams into which the treated liquid was discharged would not be de-oxygenated thereby. Then it was realized that the abundance of mineral nutrients from the treated wastewater, combined with sunlight, fostered plant life over animal life, creating eutrophic bodies of water in which the uncontrolled proliferation of various algae and plant species in salt water bays and in fresh water lakes and rivers itself caused de-oxygenation as the dying plants and algae decayed. By E.P.A. estimates, 40 percent of the nation's rivers, 51 percent of the lakes, and 57 percent of the estuaries have been adversely affected by nutrient over-enrichment.

For many years, scientists and engineers attempted to control eutrophication by reducing the amount of ammonia, a poison in itself to aquatic animal life, that was discharged from wastewater treatment plants. Biological aerobic treatment, one of the processes for reducing ammonia, created nitrates and nitrites. Realizing that these are favored plant foods, aerobic treatment of the wastewater was followed by biological anoxic treatment for reducing the nitrates and nitrites to nitrogen gas that harmlessly escaped to the atmosphere.

Next it was realized that denitrification was insufficient because several microbial species can use nitrogen gas from the atmosphere as a source of nitrogen for cellular synthesis. In consequence, phosphorus control was recognized as the key to controlling eutrophication. For years, chemical reactants were added for precipitating phosphorus as sludge. However, this type of phosphorus removal can significantly increase sludge production, typically from 50 percent to 100 percent. In addition to the cost of the chemical reactants, disposal of the additional sludge is expensive.

The poultry industry, for example, has also increased its use of trisodium phosphate (T.S.P.) and other chemical products in order to comply with federal zero-tolerance requirements for eliminating fecal material. The typical poultry plant output of phosphorus is in the range of 15 to 20 mg per liter, but use of T.S.P. in processing operations can increase the phosphorus concentration in the wastewater by 200 percent to 300 percent.

Biological phosphorus removal (BPR) is a simple but effective process that conventionally requires the wastewater to pass through an anaerobic zone and then an aerobic nitrification zone before the mixed liquor is settled in a clarification zone and a portion of the resulting settled sludge is recycled to the aerobic nitrification zone. BPR is improved by inserting an anoxic zone between the anaerobic zone and the aerobic zone so that BPR is combined with biological nitrification and denitrification, as described for municipal wastewater by Dr. Clifford W. Randall, Virginia Polytechnic Institute and State University, in "Theory and Practices of Biological Nutrient Removal."

In the anaerobic zone, which must be adequately mixed, a population of excess phosphorus-storing (polyP) bacteria, such as acinetobacter and other phosphate-accumulating microorganisms that are able to store high amounts of phosphate, up to 10% by weight as polyPhosphate inside the cells, are present. In addition, a suitable substrate, such as soluble carbonaceous Chemical Oxygen Demand (COD) and BOD, in the form of volatile acids, must be present. The 7.3 kcal/mol of energy per mol of adernosine triphosphate (ATP) that is liberated by the hydrolysis of ATP by the polyP bacteria becomes available to the polyP cells, releasing phosphate and forming adenosine diphosphate, ADP. The polyP bacteria use this released energy to polymerize a substrate of organic compounds, such as acetic acid, propionic acid, and other short-chain volatile fatty acids (VFAs), as well as short-chain alcohols, for intracellular storage as polymerized compounds, such as poly-$\beta$-hydroxybutyrate (PHB) or poly-$\beta$-hydroxyvalerate (PHV).

However, other forms of BOD, such as proteins, cannot be used by the polyP bacteria. Nevertheless, during passage through the basins, a portion of these proteins are gradually broken down by other forms of bacteria into VFAs that gradually become available to the polyP bacteria. This anaerobic breakdown of organic compounds, by enzymes or microorganisms, to simpler products is termed fermentation and occurs naturally in all anaerobic, facultative, and aerobic lagoons. The polyP bacteria actually intercept the breakdown of such organic compounds that would otherwise produce $CO_2$ and water.

Because the polyP bacteria have no electron acceptors available in the anaerobic zone, they cannot produce new cellular material and multiply in the anaerobic zone, but they can remove certain available organics from solution and sequester them for later utilization in the subsequent aerobic zone where electron acceptors are available. In this aerobic zone, the polyP bacteria have the first opportunity to utilize the BOD so that they have a competitive advantage over the non-polyP bacteria. Thus they can proliferate at a higher rate in the aerobic zone and dominate the activated sludge bacterial population that includes autotrophic nitrifiers using ammonia as their energy source for converting ammonia to nitrite and nitrate.

When the polyP bacteria enter the aerobic zone, they metabolize the stored intracellular compounds for growth and energy. Because excess energy is generated beyond the needs for growth, the polyP bacteria, now much more abundant because of their growth, remove phosphate from solution and store the energy in intracellular phosphate bonds during a "luxury" uptake stage, whereby large quantities of phosphorus are removed from the system in the portion of the sludge that is wasted after clarification. This BPR activity is desirable, but nitrification and de-nitrification are also needed.

The key factor that determines the amount of phosphorus stored in the activated sludge is the amount of readily available organic matter in the anaerobic zone and the absence of electron acceptors such as oxygen and nitrate. The bacteria will preferentially metabolize the organic matter rather than store it if electron acceptors, i.e., dissolved oxygen or oxygen from nitrates and nitrites, are available. Some such electron acceptors are always present in the inflowing wastewater. There must consequently be a large excess of organic matter beyond that needed to deplete the electron acceptors recycled or entrained into the anaerobic zone. In other words, the quantity of stored substrate in the form of organic matter and subsequently the biological removal of phosphorus will be reduced by the quantity of electron acceptors present in the anaerobic zone. U.S. Pat. relating primarily to BPR include U.S. Pat. Nos. 5,288,405; 5,342,522; 5,380,438; 5,480,548; 5,833,856; and 5,853,589.

Biological nitrogen removal (BNR) is another essential wastewater treatment process. It is possible for the BNR process to operate without utilizing an initial anaerobic zone. For example, an initial anoxic zone can be used to cause release of oxygen and depletion of nitrogen as nitrogen gas from broken-down nitrates and nitrites. As a general rule, five parts of BOD per one part of nitrogen (measured as Total Kjeldahl Nitrogen, TKN) must be initially available in order to obtain adequate BNR. This TKN measurement includes $NH_3$ but does not include nitrates or nitrites.

For example, U.S. Pat. No. 5,611,927 describes a wastewater treatment system that mixes activated sludge with influent wastewater under anoxic conditions in the presence of luxury uptake organisms to cause release of phosphorous compounds into the surrounding wastewater. The wastewater is then aerated in the presence of nitrifying organisms to convert ammonia into nitrate compounds while the luxury uptake organisms take up the phosphorous compounds. The wastewater is next subjected to alternating anoxic and oxic conditions in a plurality of cycles, preferably using two tanks in parallel, to reduce the nitrates to nitrogen gas using denitrifying organisms. The resulting effluent is substantially free of both nitrogen-based and phosphorus-based nutrients.

Although the above-listed U.S. patents also involve BNR activity, U.S. Pat. Nos. 5,401,412 and 5,447,633 are primarily directed to BNR.

Wastewater outflows from a food processing plant may occur during a work week varying from as little as two days, with holidays, to six days. However, equal flows during the entire 7-day week are needed for processing the wastewater. To achieve such equalization, lagoons must be used. They may be anaerobic, facultative, or aerobic, as shown in FIG. 1, wherein $Q_5$ represents the inflow to a lagoon during a normal work day and $Q_7$ represents the outflow from the lagoon during any day of the week.

In any case, these lagoons of the prior art significantly reduce BOD of the wastewater while only minimally reducing TKN and TP so that the equalization lagoon effluent has much lower BOD but only slightly reduced nitrogen and phosphorus, nutrients that must not be allowed to enter natural bodies of water. In effect, the microorganisms in the prior art lagoons eat up the BOD during the equalization process but do not eat up the nitrogen and phosphorus. This disproportionate loss of BOD makes it more difficult to remove nitrogen and phosphorus in downstream biological processes. In fact, during prior art processes, BOD must often be added in the form of methanol for denitrification and/or in the form of volatile fatty acids for phosphorus removal.

In industrial poultry processing operations, wastewater pretreatment systems are typically installed and operated upstream of biological final treatment systems. These pretreatment systems include primary and secondary screening to remove meat and feathers, respectively, followed by a chemical treatment and flotation to cause non-soluble solid particles to flocculate together and form a sludge cake containing fat, oil, and grease that floats to the surface and is removed by skimming in a Dissolved Air Flotation (DAF) Cell.

A flow equalization lagoon follows the DAF Cell to provide 24-hour/7-day hydraulic flow equalization and first-stage BOD removal. As shown in FIG. 1, such lagoons typically operate anaerobically but may be operated as facultative lagoons or as aerobic lagoons. They are designed with sufficient capacity to receive raw wastewater inflow generated two-to-six-days/week (allowing for holidays) and to have sufficient equalization volume for wastewater to be discharged or pumped out of the lagoon at a relatively constant rate for 24 hours per day and seven days per week.

These large anaerobic pretreatment lagoons of the prior art are normally unheated and therefore often provide high efficiency BOD pretreatment during the summer months and lower BOD pretreatment efficiency during the winter months. If no DAF Cell is installed upstream of the lagoon, solids and grease accumulation in these lagoons can additionally cause erratic effluent quality and BOD content, especially during the spring and fall seasons when the lagoon temperature is rising and falling, respectively.

Moreover, while prior art anaerobic lagoons remove much BOD, they remove only a small percentage of TKN or ammonia, as indicated in FIG. 2 with typical data, wherein the BOD/TKN ratio is reduced from 12.5 to 2.6 while TKN and TP are reduced only very slightly. Consequently, the BOD/TKN ratio in the lagoon effluent is seasonally variable and is often lower than the desired ratio of at least 5:1 on a weight basis that is necessary for accomplishing downstream denitrification, outside of the lagoon.

In other words, the variable and sometimes excessive BOD removal efficiency, insignificant nitrogen removal efficiency, and low phosphorus removal efficiency that are provided by prior art anaerobic lagoons result in a lagoon effluent having a BOD/TKN ratio (indicating, in effect, carbonaceous oxygen demand/nitrogenous oxygen demand) that is variable, difficult to control, and often too low for high efficiency of total nitrogen removal by nitrification/denitrification in a downstream final treatment system utilizing activated sludge.

These prior art lagoons typically receive wastewater having a nitrogen content, measured as 100 parts of TKN (Total Kjeldahl Nitrogen), that is derived from 20 parts of $NH_3$ and 80 parts of organic N. After the anaerobic, facultative, and/or aerobic bacteria in these lagoons have been active during flow equalization, the nitrogen content is slightly less than 100 parts, caused by slight nitrogen uptake for biomass growth. BOD is thus significantly reduced, but nitrogen content is substantially unchanged.

As shown in FIG. 1, typical $Q_5$ (flow per day during a 5-day week) and $Q_7$ (flow per day during a lagoon-averaged 7-day week) analyses for inflow and outflow streams of prior art anaerobic, facultative, and aerobic lagoons, operated as flow equalization basins, show that BOD is greatly decreased and $NH_3$ is greatly increased because of deamination (biological activity by various bacterial species) during passage through the lagoon. Deamination is specifically defined as splitting off ammonia from amino acids and proteins by hydrolysis, with formation of the corresponding fatty acids. As illustrated in FIG. 2, such deamination changes most of the BOD to Volatile Fatty Acids (VFAs) and fermentation by other bacteria eventually creates $CO_2$ and $H_2O$ and changes a small portion of the TKN to $NH_3$.

It should be understood that the TKN represents all sources of unoxidized nitrogen, including all proteins, such as blood and muscle particles, as well as $NH_3$, but does not include nitrates or nitrites. Deamination of these proteins creates most of the $NH_3$ in all lagoons, as also illustrated in FIG. 2, and continues in the downstream units of both prior art processes and the process of this invention.

Using these typical figures, the BOD/TKN ratio changes from 1500/120 to 300/115, or from 12.5 to 2.6. Because this ratio must be maintained at or above 5.0 on a weight basis in order to have sufficient BOD in subsequent operations for denitrification, nitrification, and luxury uptake of phosphate to take place in adequate quantities, these prior art lagoons generally create highly unsatisfactory downstream conditions during most of the year.

The only U.S. patent that is known to disclose the use of lagoons for biological treatments is No. 4,277,341 of William F. Wise et al. However, the lagoons are described as open bodies of water, not flow equalization systems, and are exemplified by treatment of municipal sewage. They are preferably facultative aerated lagoons, i.e., lagoons in which both aerobic and anaerobic biological treatments take place. Equipped with a plurality of diffused aerators and submerged collectors in the form of horizontally extending tubes having an array of holes on the underside and containing biological reaction media for the growth of nitrifying bacteria, nitrification takes place as the water is pumped through the tubes and out of the lagoon at a controlled velocity gradient until the tubes are periodically backwashed with air. Then any solids collected within the tubes, including a portion of the nitrified film which has formed on the biological reaction media, are discharged and settled as a sludge on the lagoon floor where anaerobic denitrification occurs. No biological phosphorus removal is mentioned.

Nitrogen and phosphorus removal efficiencies at three poultry processing plant wastewater treatment systems were described in a presentation by John H. Reid, P. E., Reid Engineering Company, Inc., for the 1999 Environmental Management Seminar, Atlanta, Ga., Aug. 18–19, 1999. All three of the described facilities had stringent BOD, Total Suspended Solids (TSS), and Ammonia Nitrogen permit limitations. All were operated to achieve both Total Phosphorus (TP) and Total Nitrogen (TN) permit limitations.

Using Cases 1, 2, and 3 to describe these three wastewater treatment facilities, Case 1 was a 1.0 Million Gallon per Day (MGD) design capacity poultry processing plant wastewater treatment system with multi-stage activated sludge reactors providing nitrification and denitrification followed by phosphorous removal by chemical precipitation in the final clarifier with effluent polishing by tertiary filtration. Its permit limits for Ammonia Nitrogen was 3.0 mg/L and for Total Phosphorous was 0.50 mg/L. Although most of the unit arrangements and operations were closely similar to those of the invention, as described hereinafter, phosphorus removal by control of dissolved oxygen and nitrate oxygen in the "7 DAY F.E.B. ANAEROBIC/ANOXIC REACTOR No. 1A" was not utilized. Phosphorus removal was knowingly achieved only by dosage of aluminum sulfate solution into the mixed liquor discharge flow by chemical precipitation in the final clarifier, with augmentation by polymer solution.

Case 2 was a 0.75 MGD design capacity poultry processing plant wastewater system, with multi-stage activated sludge reactors providing nitrification and denitrification, and partial biological phosphorous removal followed by final phosphorous removal by chemical precipitation in the final clarifier. Its permit limits for Ammonia Nitrogen was 3.0 mg/L, for total Nitrogen was 5.0 mg/L, and for total Phosphorous was 0.50 mg/L. Its anaerobic lagoon received no recycles and was operated as a prior art lagoon.

Case 3 was a 0.95 MGD design capacity poultry processing plant wastewater treatment system with multi-stage FEB activated sludge reactors providing denitrification and partial biological phosphorous removal followed by final phosphorous removal by chemical precipitation in the final clarifier. These FEB reactors were started up after June 1999. Its permit limits for Ammonia Nitrogen were 2.7 mg/L and for Total Phosphorous was 2.0 mg/L. Case 3 is the instant invention.

There is consequently a need to utilize flow equalization lagoons for simultaneously performing flow equalizing, the hydrolysis stage of biological phosphorus removal, controlled BOD reduction, and denitrification of nitrates and nitrites from recycled wastewater inflows while avoiding septic conditions and maintaining high BOD/TKN ratios, whereby luxury uptake of phosphate ions, aerobic nitrification of ammonia, and complete aerobic BOD reduction are all that must be done before the mixed liquor is clarified by settling to produce sludge and clarified liquor.

Expressed more simply, the prior art flow equalization lagoon needs to be utilized for efficient biological ATP hydrolysis and nitrogen removal while maintaining a uniform 7-day/24-hour outflow and high BOD/TKN and BOD/TP ratios in the lagoon during all seasons of the year. In view of the numerous chemical and biological reactions, tightly controlled dissolved oxygen contents, selectively directed recycle streams, and vigorous mixing involved with such improvements, "basin", "flow equalization basin (FEB)" or "FEB reactor" are used hereinafter instead of lagoon, and "nitrification reactor" and "anoxic reactor" are used hereinafter for subsequent treatment units, in order to distinguish these units from prior art systems.

SUMMARY OF THE INVENTION

The object of this invention is to utilize at least one FEB reactor to perform controlled biological ATP hydrolysis, de-nitrification, and partial reduction of biological oxygen demand while simultaneously providing hydraulic flow equalization.

It is a further object to conduct ATP hydrolysis and partial BOD reduction in the inlet portion of a single FEB reactor and to conduct denitrification in the outlet portion of the FEB reactor, whereby outflows therefrom are substantially free of nitrates and nitrites.

It is a still further object to maintain high BOD/TKN and BOD/TP ratios within a single FEB reactor during all seasons of the year.

It is another object to utilize two sequentially disposed FEB reactors to provide hydraulic flow equalization for up to 24 hours per day and seven days per week while conducting ATP hydrolysis and partial BOD reduction in the first FEB reactor and conducting denitrification in the second FEB reactor, whereby outflows therefrom are substantially free of nitrates and nitrites.

It is an additional object to recycle mixed liquor containing nitrate and nitrite compounds from the downstream final treatment system into the inlet zone of the second FEB reactor in order to provide recycled biomass plus nitrate and nitrite oxygen as the primary oxygen source for carbonaceous BOD removal, while accomplishing nitrogen removal by biological denitrification of the recycled nitrate/nitrite compounds.

It is also an object to recycle anoxic mixed liquor from the second FEB reactor to the first FEB reactor to create mixed liquor therein that is substantially depleted of nitrates, so that the first FEB reactor operates on the borderline between anaerobic and anoxic conditions or therebelow while providing efficient BPR activity because no other electron acceptor is present.

It is additionally an object to provide means to controllably add sufficient dissolved oxygen to the first FEB reactor for preventing septic conditions while maintaining a generally anaerobic state.

It is a final object to provide a plurality of methods to control the biological phosphorus removal (BPR) and the biological nitrogen removal (BNR) activities and the simultaneous carbonaceous BOD removal during all periods of the year, varying from very cold winter periods to very hot summer periods, in either a single FEB reactor or in a sequence of two or more FEB reactors.

According to these objects and the principles of this invention, a method is set forth for improving a conventional flow equalization lagoon which equalizes 2-to-6-day inflow to the lagoon of nitrogenous food processing plant wastewater, having high biological oxygen demand (BOD), to produce uniform 7-day/24-hour outflow.

This improvement enables multiple biological reactions to be performed therein that consume normal amounts of the BOD and enhance phosphorus and nitrogen removal from the wastewater, comprising the following steps:

A) dividing the lagoon into two separately mixed portions which operated as a first FEB (Flow Equalization Basin) reactor and a second FEB reactor, the first FEB reactor receiving the inflow and the second FEB reactor receiving outflow from the first FEB reactor;

B) partially recycling denitrified mixed liquor, as uniform 7-day/24-hour outflow from the second FEB reactor, to the first FEB reactor to produce mixed liquor therein and feeding the remaining outflow to a nitrification reactor that also receives activated sludge from a downstream clarifier;

C) maintaining the nitrification reactor under aerobic conditions in its supernatant liquor for:
   1) enabling polyP bacteria in its mixed liquor to multiply, by utilizing a polymerized substrate of organic compounds stored intracellularly, and to ingest phosphate ions on a luxury uptake basis; and
   2) nitrifying ammonia, created by deamination of proteins in the inflow, to produce nitrified mixed liquor that is separated into a recycle stream and a remainder stream, the recycle stream being fed to the second FEB reactor and the remainder stream being fed to an anoxic reactor;

D) maintaining the first FEB reactor under anaerobic/anoxic conditions in its mixed liquor, whereby the polyP bacteria therein hydrolyze adenosine triphosphate (ATP) and form adenosine diphosphate (ADP) while polymerizing Volatile Fatty Acids (VFAS) to form the substrate of organic compounds for intracellular storage and releasing the phosphate ions; and E) maintaining the second FEB reactor under anoxic or anoxic/aerobic conditions in its mixed liquor, whereby nitrates and nitrites in the nitrified mixed liquor are reduced to release nitrogen gas and form the denitrified mixed liquor. A flow equalizing basin or lagoon utilized according to this invention is termed an FEB reactor because many critically important chemical, biochemical, and biological reactions occur therein. These reactions include biological phosphorus hydrolysis, denitrification, and selectively limited removal of biological oxygen demand during flow equalizing while maintaining high BOD/TKN and BOD/TP ratios within the inflow portion of the FEB reactor that is operated on an anaerobic/anoxic basis.

The invention also comprises a method of utilizing a wastewater flow equalization basin as an FEB reactor for multiple biological treatments of inflowing proteinaceous processing wastewater containing BOD by converting the wastewater to mixed liquor and controlling dissolved oxygen (D.O.) levels in the mixed liquor while consuming conventional amounts of BOD, the multiple biological treatments comprising deamination of proteins to form ammonia, hydrolysis of adenosine triphosphate (ATP) to form adenosine diphosphate ADP) while releasing phosphate ions and energy and ingesting volatile fatty acids (VFAs) by polyP bacteria, and denitrification of recycled nitrates and nitrites.

The FEB reactor is divided into an inflow portion and an outflow portion, receives an inflow stream of the wastewater in the inflow portion, and produces a 7-day and 24-hour equalized outflow stream from the outflow portion that is divided into a first recycle stream and a first remainder stream, the first recycle stream being fed to the inflow portion to produce mixed liquor therein and the first remainder stream being fed to a nitrification reactor that produces nitrates and nitrites.

The FEB reactor is operated within the inflow portion as an anaerobic/anoxic reactor and is operated within the outflow portion as an anoxic/aerobic reactor.

The nitrification reactor produces an outflow stream, containing the nitrates and nitrites, that is divided into a second recycle stream and a second remainder stream, the second recycle stream being fed to the outflow potion of the FEB reactor and the second remainder stream being fed to an anoxic reactor, containing a mixer, for denitrifying the nitrates and nitrites.

The invention further comprises a method of utilizing an FEB reactor, having an inflow portion and an outflow portion, to perform multiple biological reactions, in addition to equalizing 2-to-6-day nitrogenous food processing plant wastewater inflow to the FEB reactor to produce uniform 7-day/24-hour outflow, the wastewater having high biological oxygen demand (BOD), comprising the following steps for performing these reactions:

A) admixing recycled and denitrified mixed liquor with the wastewater within the inflow portion of the FEB reactor;

B) maintaining anaerobic/anoxic conditions in the mixed liquor within the inflow portion in the absence of nitrites and nitrates to obtain release of energy and phosphate ions by polyP bacteria that hydrolyze adenosine triphosphate (ATP) and form adenosine diphosphate (ADP) while polymerizing a substrate of organic compounds for intracellular storage;

C) admixing recycled mixed liquor containing nitrite and nitrate ions within the outflow portion; and D) maintaining anoxic conditions in the mixed liquor within the outflow portion to obtain denitrification of the nitrites and nitrates and release of nitrogen as gas, whereby a portion of the BOD is consumed for performing these reactions.

The anaerobic conditions are defined as dissolved oxygen (D.O.) being between 0.0 and 0.15 mg/L and nitrate ions being less than 2 mg/L of influent mixed liquor. The anoxic conditions are defined as D.O. being between 0.1 and 0.3 mg/L of mixed liquor and nitrate being greater than 2.0 mg/L. The aerobic conditions are defined as D.O. being between 1.0 and normally up to 3.0 mg/L of mixed liquor. Measurements are made in supernatant liquor after settling of mixed liquor.

When constructing a new wastewater treatment facility:
A) the inflow portion is a first FEB reactor;
B) the outflow portion is a second FEB reactor connected in series with and downstream from the first FEB reactor; and
C) outflow of denitrified mixed liquor from the second FEB reactor is the uniform 7-day/24-hour outflow and is fed:
1) partially to the first FEB reactor as the recycled and denitrified mixed liquor admixed with the inflowing wastewater, and
2) partially to a downstream nitrification reactor.

The 2-to-6-day nitrogenous food processing plant wastewater inflow is defined as $Q_{2-6}$. When this $Q_{2-6}$ is equalized over 24 hours and 7 days, the uniform 7-day/24-hour outflow is defined as $Q_7$ that is herein identified as Q.

The recycled and denitrified mixed liquor recycled from the outflow of the second FEB reactor to the first FEB reactor is 100–200% of Q.

The nitrification reactor is preferably operated under aerobic conditions in order to:
A) nitrify ammonia that is produced by deamination of proteins in the wastewater inflow to produce nitrites and nitrates from the ammonia; and
B) enable the polyP bacteria to utilize the substrate of organic compounds for multiplying while ingesting the phosphate ions on a "luxury" uptake basis.

When the nitrification reactor is continuously used aerobically:
A) nitrite/nitrate-containing outflow from the nitrification reactor is divided into a nitrified recycle portion and a nitrified downstream portion; and
B) the nitrified recycle portion, being within the range of 200% to 400% of Q, is fed to the second FEB reactor as the recycled mixed liquor containing nitrite and nitrate ions that is admixed within the second FEB reactor.

A subportion of the nitrified recycle portion, within the range of 0 to 200% of Q, can be selectively fed to the first FEB reactor in order to maintain its D.O. under anaerobic conditions during unusually hot summer weather or excessive inflows.

The nitrified downstream portion is within the range of 200% to 300% of Q and is fed to a clarifier wherein clarified liquor and activated sludge are produced.

The activated sludge is divided into a sludge recycle portion that is fed to the nitrification reactor and a sludge remainder portion, the sludge recycle portion being within the range of 100% to 200% of Q.

When the nitrification reactor is continuously used aerobically, an anoxic reactor is preferably interposed between the nitrification reactor and the clarifier, whereby the nitrified remainder portion is fed to the anoxic reactor in which anoxic conditions cause denitrification of the nitrified remainder portion to produce a denitrified outflow that is fed to the clarifier.

A mixer is preferably interposed between the anoxic reactor and the clarifier for selectively admixing polymer flocculant and aluminum chloride coagulant with the denitrified outflow for producing an admixed outflow that is fed to the clarifier.

A method for biological treatment of wastewater, containing proteinaceous materials from an animal slaughtering plant after fat, oil, and grease have been removed from said wastewater, comprising the following steps for multiple biological treatments of the wastewater within a sequence of flow equalization basins that equalize inflow from 2 to 6 days of operation of the plant per week to substantially uniform outflow during 24 hours per day for seven days per week, comprising the following steps:

A) operating a first flow equalization basin as a first FEB reactor wherein mixed liquor is formed therein and dissolved oxygen therein is controlled to be between anaerobic and anoxic states for hydrolysis of adenosine tripolyPhosphate to adenosine diphosphate and liberation of both phosphate ions and energy by polyP bacteria;
B) operating a second flow equalization basin as a second FEB reactor wherein dissolved oxygen therein is controlled to be at the anoxic state for denitrification of nitrites and nitrates within the mixed liquor to form nitrogen gas;
C) delivering a remainder portion of the substantially uniform outflow from the second FEB reactor to a nitrification reactor and operating the nitrification reactor under aerobic conditions to nitrify ammonia formed by deamination within the wastewater for producing nitrites and nitrates and to enable the polyP bacteria to ingest the phosphate ions at a luxury uptake rate while multiplying in numbers, thereby producing nitrite/nitrate liquor; and
D) delivering a recycle portion of the substantially uniform outflow from the second FEB reactor to the first FEB reactor to form mixed liquor therein; and
E) recycling a portion of the nitrite/nitrate liquor from the nitrification reactor to the second FEB reactor.

Although use of a single FEB reactor is satisfactory, it is often more practical to utilize two or more FEB reactors. Assuming that two FEB reactors are used, an initial basin, termed the first FEB reactor, receives pretreated wastewater from a DAF Cell plus a recycle of mixed liquor from the second FEB reactor that creates mixed liquor within the first FEB reactor and causes this liquor to be selectively cycled between anaerobic and anoxic conditions in order to use some of the BOD for phosphorus removal within this first FEB reactor.

This recycle of anoxic liquor from the second FEB reactor, amounting to approximately 100% to 200% of Q, thereby produces mixed liquor in the first FEB reactor, and the capability of its variation is the first control method of the invention. In addition, the subportion of the nitrified recycle stream from the nitrification reactor to the second FEB reactor may vary from zero to 200% of Q and is the second control method of the invention. This selective nitrate recycle that supplies $NO_3/NO_2$ nitrate oxygen as its source of oxygen is particularly useful when scarcity of oxygen is causing or threatening to cause breakdown of $SO_4^=$ compounds, producing $H_2S$. The operator's sense of smell is, of course, a sensitive test of this control point. 2Q to 5Q is thereby available as the outflow from the first FEB reactor to the second FEB reactor.

The two FEB reactors achieve 65% to 85% nitrogen removal. This denitrification also increases alkalinity and pH in the outflow, thereby reducing the amount of caustic to be added.

As an additional control step, the FEB reactor is provided with an aeration system that can be throttled and/or cycled on and off to provide cyclical oxygen transfer into the FEB reactor according to automatic timer controls during unusual weather conditions.

As another control step, the nitrification reactor is provided with an aeration system that can be selectively throttled and/or cycled on and off to provide cyclical oxygen transfer into the nitrification reactor, whereby the reactor can be varied from aerobic conditions, functioning to convert $NH_3$ to nitrates/nitrites, to anoxic conditions, functioning to convert nitrates/nitrites to nitrogen gas and oxygen.

As a third control measure, oxygen transfer capability is provided in each FEB reactor by a coarse or fine bubble diffused aeration or jet aeration system with air supplied by selective operation of one to three positive displacement blowers. These air supply blowers can be cycled on and off to provide cyclical oxygen transfer into either FEB reactor according to automatic timer controls. Alternatively, the blowers can be continuously maintained at a selected low rate of delivery. One or more of these control measures are normally needed only during very hot, prolonged summer seasons.

The nitrification reactor is preferably a deep aeration tank operated as a complete mix aeration basin, whereby the mixed liquor can be varied from aerobic operation (above 1.0 mg/L of oxygen), for nitrifying the mixed liquor, to anoxic operation (below 0.3 mg/L of D.O.), for denitrifying the mixed liquor. Under these operating conditions, an anoxic reactor disposed downstream of the nitrification reactor is not needed. It is preferred, however, to operate the nitrification reactor continuously aerobically with an anoxic reactor disposed downstream of the nitrification reactor.

BRIEF DESCRIPTION OP THE DRAWINGS

FIG. 1 is a schematic representation of the three types of flow equalization lagoons commonly used in the prior art as to the BOD, TKN, $NH_3$, and TP contents of their effluent wastewaters.

FIG. 3 is a representation of changes in BOD, TKN, $NH_3$, and TP of the FEB reactors of the instant invention.

DETAILED DESCRIPTION OF THE PREFERRED EMBODIMENTS

Figure 4:
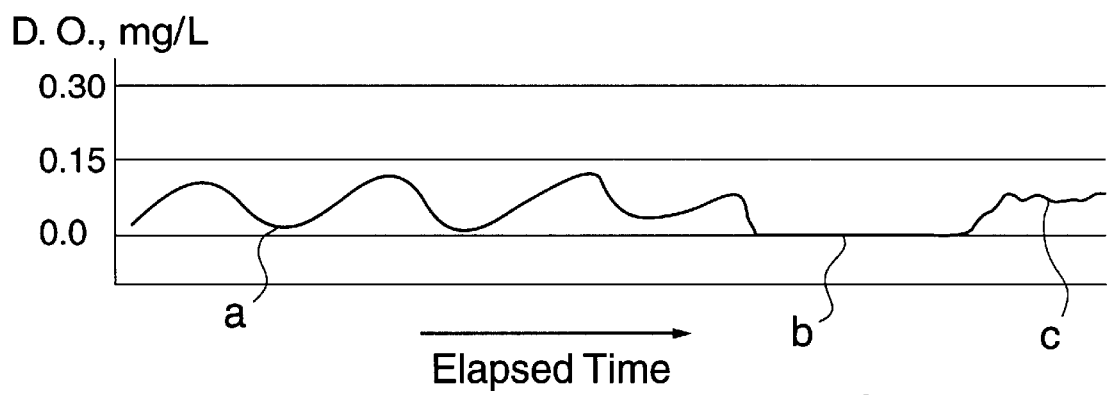
FIG. 4 illustrates typical dissolved oxygen changes in an anaerobic/anoxic FEB reactor of the invention.

Irregular curve a in FIG. 4 illustrates typical changes in dissolved oxygen in FEB reactor 20A and in the inlet half of FEB reactor 120, as mixing, fermentation, deamination, and hydrolysis of ATP occur, with low $NO_3$ recycle and no air addition. Straight portion b illustrates true anaerobic conditions that, if prolonged for three to four days, will force sulfate-reducing bacteria to break down sulfates and produce hydrogen sulfide. Curve c illustrates resumption of slightly anoxic conditions as air is added from the bubble aerators and/or nitrified liquor from the nitrification reactor is added to FEB reactor 20A.

Figure 5:
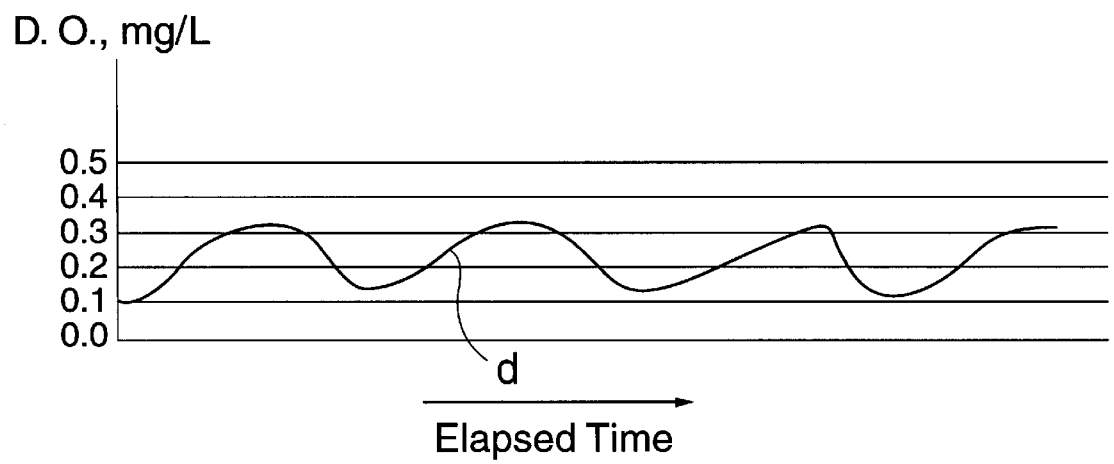
FIG. 5 illustrates typical dissolved oxygen changes during mixing in an FEB reactor of the invention that is maintained in an anoxic or anoxic/aerobic state.

Irregular curve d in FIG. 5 illustrates the wider cyclical variations in dissolved oxygen that typically occur during mixing as nitrates are added from nitrification reactor 30 to FEB reactor 20B or the outlet half of FEB reactor 120.

Figure 6:
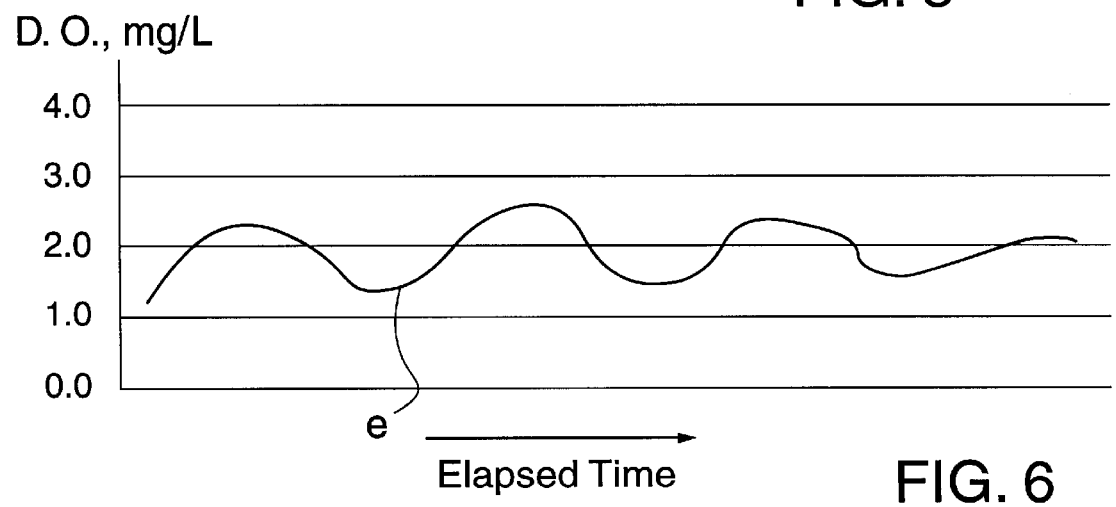
FIG. 6 illustrates the dissolved oxygen (D.O.) changes, occurring during typical mixing, in the mixed liquor within a nitrification reactor of the invention while in aerobic operation.

Irregular curve e in FIG. 6 illustrates the cyclical variations in dissolved oxygen that typically occur in nitrification reactors 30, 130 when they are operated under aerobic conditions for conversion of ammonia to nitrites and nitrates.

Figure 7:
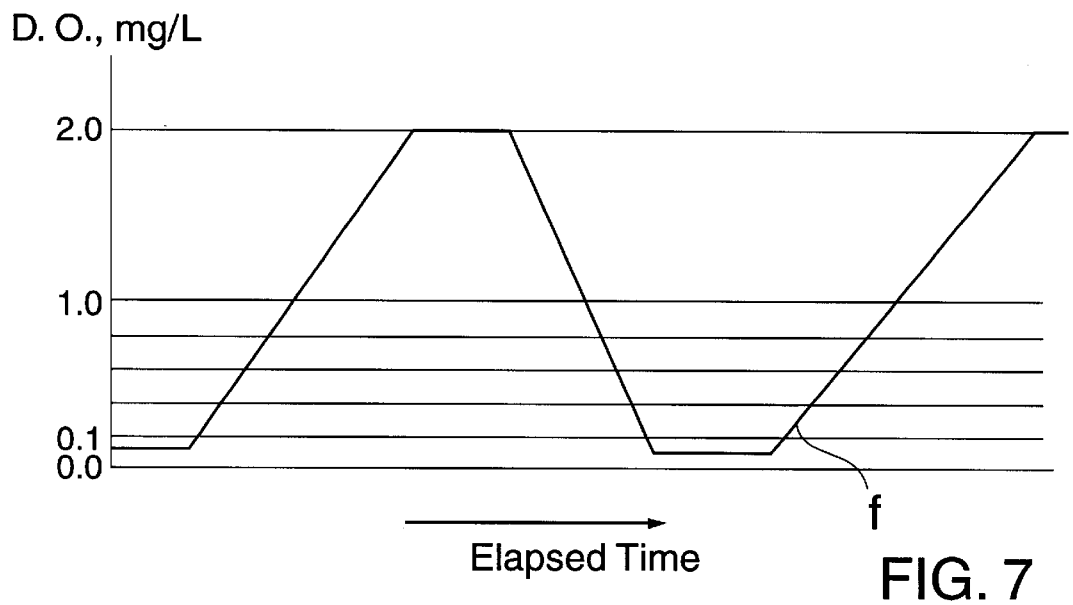
FIG. 7 illustrates the dissolved oxygen changes, occurring during typical mixing, in the mixed liquor within a nitrification reactor of the invention while in anoxic/aerobic operation.
Figure 2:
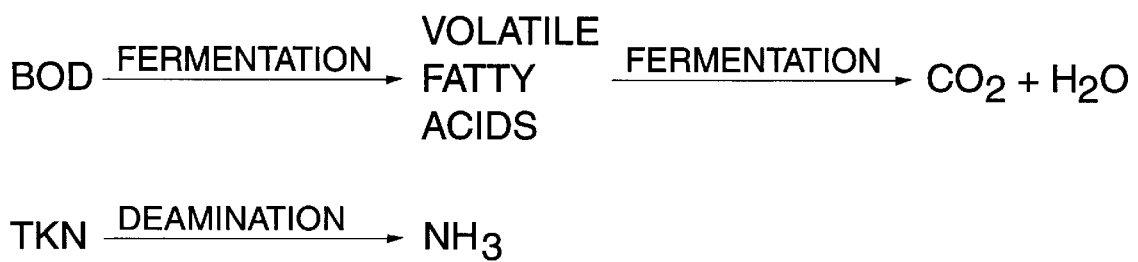
FIG. 2 is a schematic representation of chemical changes caused by fermentation, hydrolysis, and deamination within a flow equalization lagoon of the prior art.

Irregular curve f in FIG. 7 illustrates the cyclical variations in dissolved oxygen that typically occur in nitrification reactors 30, 130 when they are operated under anoxic/aerobic conditions for denitrification.

Figure 8:
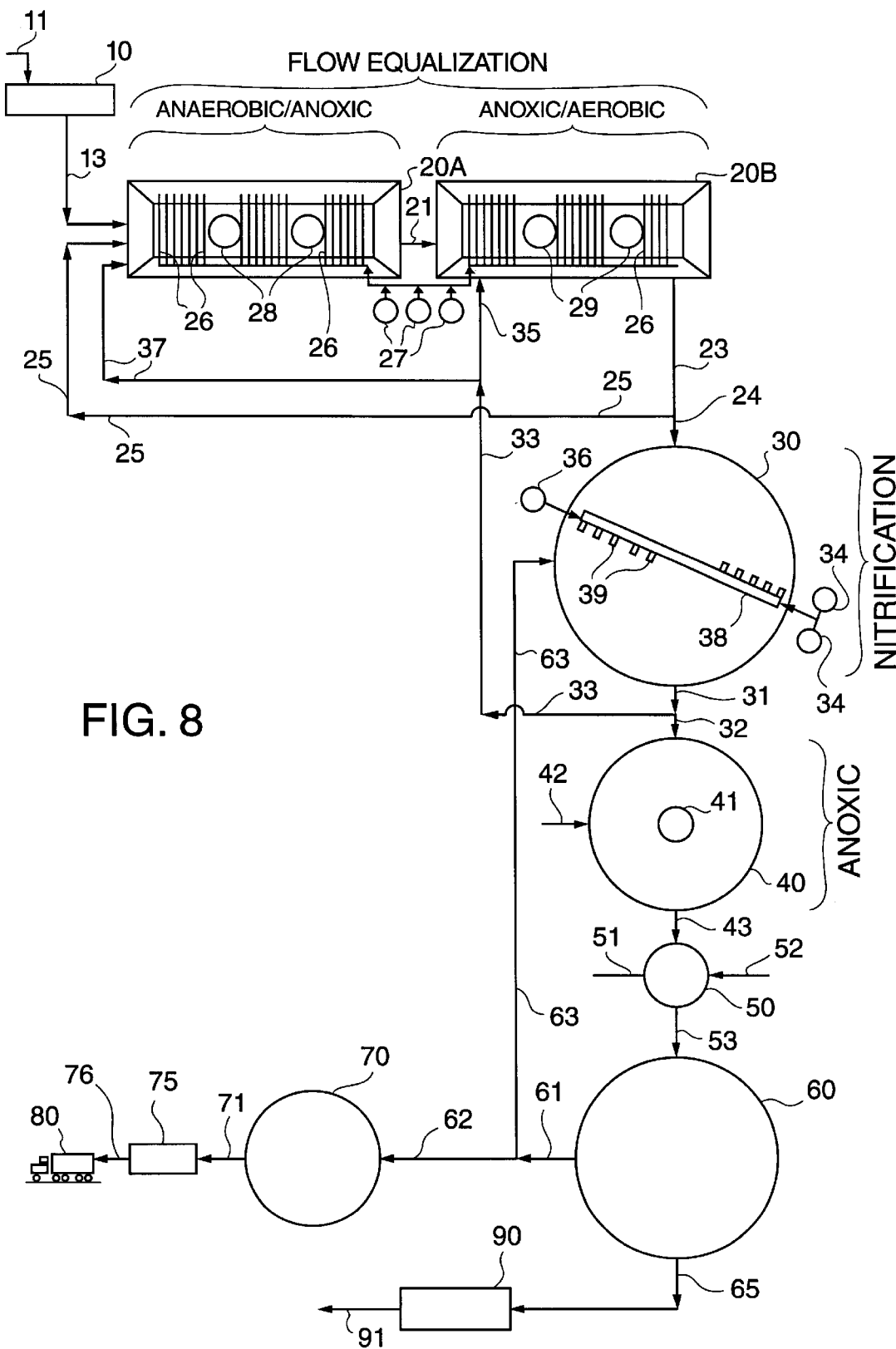
FIG. 8 is a process flow diagram of a wastewater treatment plant comprising two FEB reactors, an aerobic or an aerobic/anoxic nitrification reactor, an anoxic reactor, and a clarifier, in which the FEB reactors are used for simultaneous flow equalization, partial carbonaceous BOD removal, ATP hydrolysis, and substantial removal of nitrate/nitrite nitrogen.

FIG. 8 shows a layout of the units utilized in carrying out the flow equalization, denitrification, and biological phosphorus removal operations of the invention in two separated but sequentially disposed FEB reactors. Raw wastewater 11 enters DAF unit 10, producing wastewater 13 that is substantially free of fat, oil, and grease. Wastewater stream 13 is fed into 7-Day FEB reactor 20A. A stream of anoxic liquor 25 is also fed into the inlet end of FEB reactor 20A. Designating wastewater stream 13 to equal Q, recycled anoxic liquor stream 25 equals 1Q to 2Q. Partially equalized outflow 21, equalling 2Q to 3Q, is fed to 7-Day FEB reactor 20B.

Each FEB reactor 20A, 20B contains, for example, two floating downpumping mixers 28, 29, respectively, that maintain the basin contents as homogenous mixtures. Oxygen transfer capability is provided in FEB reactor 20A by a diffused aeration system 26 with air supplied by operation of one to three positive displacement blowers 27. The air supply blowers can be cycled on and off to provide cyclical oxygen transfer into FEB reactors 20A, 20B according to automatic timer controls. Alternatively, one or more blowers 27 can be operated continuously at a selected low flow rate.

As the mixed liquor in FEB reactor 20A hovers between anoxic and anaerobic, as illustrated by curves a and c in FIG. 4, a small portion of the polyP bacteria consume BOD while using any available dissolved oxygen as electron acceptors. However, most of the polyP bacteria are busily discharging phosphate anions to obtain energy while taking up and polymerizing a substrate of organic compounds in the BOD.

Blowers 27 supply additional air, according to the automatic timer controls or other control system, in order to avoid septic conditions and breakdown of sulfates to obtain oxygen, as illustrated by line b in FIG. 4. If necessary under extreme hot weather conditions, an additional stream 37 of aerobic mixed liquor, as illustrated by curve e in FIG. 6 or of anoxic/aerobic mixed liquor, as illustrated by curve f in FIG. 7, can be intermittently supplied, or supplied as a low volume continuous stream, from nitrification reactors 30, 130 during their anoxic phase, i.e., when their D.O. is between 0.1 and 0.3 mg/L of their mixed liquors. Stream 37 and air from system 26, each operated either intermittently or at a continuous low flow rate, thereby provide a total of four control methods for FEB reactor 20A.

FEB reactor 20B receives stream 21 of mixed liquor laden with polyP bacteria and phosphate ions plus stream 35 of mixed liquor from nitrification 30. As an approximation, stream 21 equals 2Q to 3Q in volume and stream 35 equals 2Q to 4Q in volume when stream 37 is not in use.

Denitrification takes place in FEB reactor 20B, producing nitrogen gas that escapes to the atmosphere and oxygen that is dissolved in the liquor. Fully equalized outflow stream 23 is divided into recycle stream 25 that is fed to FEB reactor 20A and remainder stream 24 that is fed to nitrification reactor 30. Stream 23 equals approximately 4Q to 7Q in volume, but stream 25 equals 1Q to 2Q, leaving stream 24, equalling 3Q to 5Q, to be fed to nitrification reactor 30.

Nitrification reactor 30 is a complete mix, activated sludge, deep aeration system operating within a tank having a liquid depth of 28 feet. One directional-mix jet aeration header 38 provides independent mixing and oxygen transfer. Operation of a jet recirculation pump 36 forces mixed liquor through jet nozzles 39 to create a counter-clockwise circular mixing pattern in the complete mix aeration tank.

A flow of compressed air to jets 39 for oxygen transfer by jet aeration headers 38 is provided by two centrifugal blowers 34. Cyclical or continuous operation of one centrifugal blower 34 is required for oxygen transfer, the second centrifugal blower 34 being used as an installed standby. Each centrifugal blower 34 can be throttled to provide from 60% to 100% of maximum blower air flow capacity to jet aeration header 38, thereby providing an additional control method. Throttling is done by manual control of a centrifugal blower inlet butterfly valve.

Jet recirculation pump 36 provides complete mixing within nitrification reactor 30 with its compressed air supply selectively either on or off, whereby reactor 30 can be selectively varied from aerobic to anoxic, as illustrated in FIG. 7. With anoxic reactor 40 in operation, however, nitrification reactor 30 is preferably operated only aerobically, as illustrated in FIG. 6. Jet aeration header 38 is constructed, for example, of heavy duty reinforced fiberglass with stainless steel supports. No diffusers or moving parts requiring maintenance are installed in reactor 30. Jet recirculation pump 36 is, for example, an end suction sewage pump installed on the exterior of nitrification reactor 30 with suction and discharge pipe isolation valves allowing complete access to the pumps for maintenance and repair. Other types of mixing and aeration equipment can be substituted. No aeration tank draining or removal and replacement of retrievable pumps or diffusers is required during operation of nitrification reactor 30.

During the aerobic cycles, the polyP bacteria multiply. Having excess energy, they go through a "luxury uptake" of phosphate ions, converting ADP to ATP, and thereby remove phosphate ions from the mixed liquor while multiplying in numbers.

Reactor 30 with jet aeration and mixing is also designed to be operated while using the Sequencing Continuous Reactor (SCR) process, as disclosed in U.S. Pat. No. 4,917, 805 to John H. Reid. The, SCR process design allows for cyclical high D.O./low D.O., oxic/anoxic operation of nitrification reactor 30 in order to minimize air supply blower power consumption and provide nitrification/denitrification operational capacity in the complete mix activated sludge process. The On/Off operating cycles of the centrifugal blowers are controlled by manually adjustable automatic timers set to independently control the aerobic cycle time and anoxic cycle time in the complete mix reactor. The centrifugal air supply blower controls are also designed for control by an automatic dissolved oxygen sensor/controller. Oxic/anoxic cycle times can be adjusted by changing the automatic centrifugal blower on/off timer controls. Centrifugal blower on/off times range from 20 minutes on/40 minutes off to 60 minutes on/60 minutes off. The time lengths of the oxic and anoxic cycles can be independently adjusted. It must be borne in mind that $NH_3$ is being generated by deamination after the mixed liquor has left FEB reactor 20B and during its passage to and through nitrification reactor 30. Ammonia removal constantly occurs by biological nitrification when nitrification reactor 30 is operated aerobically, as illustrated by curve e in FIG. 6.

However, when nitrification reactor 30 is operated on an aerobic/anoxic basis, ammonia removal also occurs during the oxic blower-On cycles when D.O. concentrations rise above 2.0 mg/L and up to 3.0 mg/L, forming nitrites and nitrates. Nitrate/nitrite removal occurs by biological denitrification during the anoxic blower-Off cycles when D.O. concentrations fall below 0.3 mg/L and down to 0.0 mg/L.

First-stage nitrate/nitrite removal occurs in upstream 7-Day FEB anoxic reactor 20B. Second-stage nitrate/nitrite removal occurs in nitrification reactor 30 when operated with alternating high D.O./low D.O. cycles. Third-stage nitrate/nitrite removal occurs in anoxic reactor 40. Nitrification reactor 30 is preferably operated with a constant high D.O. concentration of approximately 2 to 3 mg/L, as illustrated by curve e in FIG. 6 when only ammonia removal by nitrification is desired therein and when anoxic reactor 40 is in use.

When using anoxic reactor 40, outflow stream 31 from nitrification reactor 30 is divided into recycle stream 33 that is fed to anoxic reactor 20B and remainder stream 32 that is discharged into anoxic reactor 40 having downpumping mixer 41. Reactor 30 is thereby able to minimize or eliminate its anoxic cycles that are instead performed within reactor 40. If the BOD supply is sometimes insufficient, methanol can be added to reactor 40 as stream 42.

Discharge stream 43 is sent to flocculation tank 50 for mixing chemical additions, such as aluminum chloride stream 51 to obtain additional phosphorous removal by chemical precipitation in clarifier 60 and anionic polymer stream 52 for improving chemical flocculation in clarifier 60 after outflow stream 53 is fed to clarifier 60.

When, alternatively, nitrification reactor 30 is operated according to successive oxic/anoxic cycles, outflow stream 31 operates intermittently; pumping occurs when curve f in FIG. 7 is between 0.1 and 0.3 mg/L of D.O. in its mixed liquor. A portion of stream 31 is then sent as stream 33 to FEB reactor 20B. Another portion is sent as stream 32a, bp-passing anoxic reactor 40 while line 32 is closed, to flocculation tank 50 for mixing chemical additions. The mixed contents of flocculation tank 50 are similarly sent to clarifier 60.

Activated sludge stream 61 from the bottom of clarifier 60 is divided into recycle stream 63 that is fed to nitrification reactor 30 and remainder stream 62 that is fed to aerated waste sludge storage tank 70. Outflow stream 71 therefrom enters waste activated sludge belt press 75 that discharges concentrated sludge 76 into trucks 80 for ultimate disposal by land application. This sludge 76 contains a large amount of phosphorus that is thereby prevented from entering lakes and streams. Clarified liquor stream 65 passes through $Cl_2/SO_2$ disinfection unit 90 to produce clean, sanitary water stream 91, containing nitrogen and phosphorus contents below environmental requirements, for disposal in a stream or lake without harm thereto.

Figure 9:
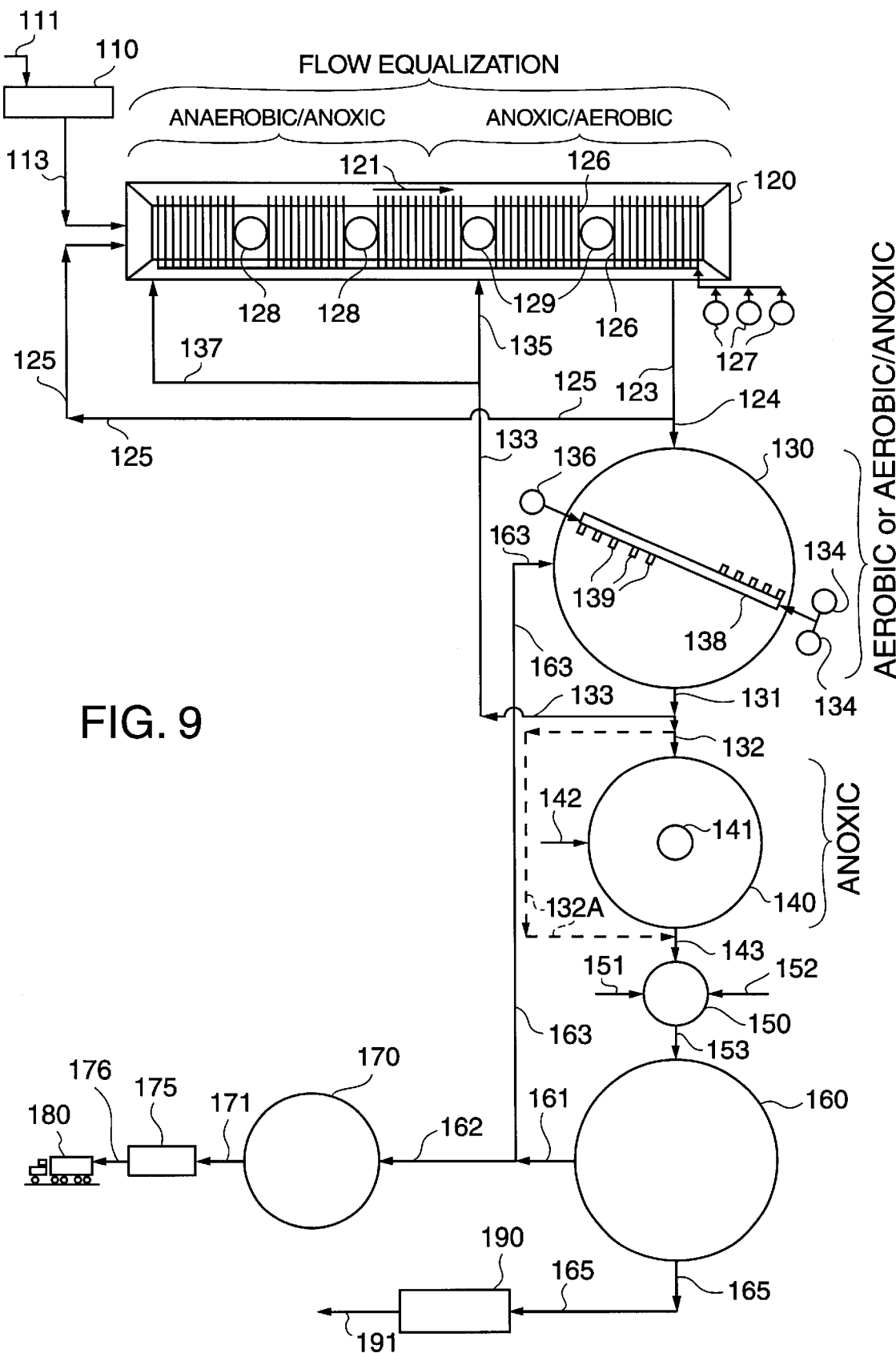
FIG. 9 is a process flow diagram of a wastewater treatment plant comprising a single FEB reactor that is equal in volume to both of the FEB reactors in FIG. 8 but is divided into two separately mixed portions, other units being identical to those in FIG. 8.

FIG. 9 shows a layout of the units, including a single FEB reactor 120, utilized in carrying out the flow equalization, denitrification, and biological phosphorus removal operations of the invention. Feb reactor 120 is divided into two separately mixed portions that are maintained at different D.O. levels in their mixed liquors.

Raw wastewater 111 enters DAF unit 110, producing wastewater 113 that is low in fat, oil, and grease. Wastewater 113 is fed into 7-Day/24-hour equalized FEB reactor 120. Its volume is approximately equal to the combined volumes of FEB reactors 20A and 20B. A stream of anoxic liquor 125 is also fed into the inlet end of the FEB reactor.

Designating 7-day wastewater stream 113 to equal Q, anoxic liquor stream 125 equals 1Q to 2Q. Partially equalized outflow 121, equalling 2Q to 3Q, moves toward the separately mixed outlet. end of the FEB reactor. For example, floating downpumping mixers 128 maintain the inlet portion as a homogeneous mixture, and floating downpumping mixers 129, for example, maintain the outlet portion as a separate homogenous mixture.

Oxygen transfer capability is provided in the inlet portion and in the outlet portion by a diffused aeration system 126 with air supplied by operation of one to three positive displacement blowers 127. Air supply blowers 127 can be cycled on and off to provide cyclical oxygen transfer into the basin according to automatic timer controls. Alternatively, one or more blowers 127 can be operated continuously at a selected low flow rate.

As the mixed liquor in the inlet portion of FEB reactor 120 hovers between anoxic and anaerobic, as illustrated by curves a and c in FIG. 4, a small portion of the polyP bacteria consume BOD while using any available dissolved oxygen as electron acceptors. However, most of the polyP bacteria are busily hydrolyzing their ATP and discharging phosphate anions to obtain energy while taking up and polymerizing a substrate of organic compounds in the BOD. Blowers 127 supply additional air, according to the automatic timer controls or another control system, in order to avoid septic conditions and breakdown of sulfates to obtain oxygen, as illustrated by line b in FIG. 4. If necessary under extreme hot weather conditions or conditions of extra incoming pollution loads, an additional stream 137 of aerobic mixed liquor containing nitrates can be supplied intermittently or continuously in low volume to the inlet portion from nitrification reactor 130. Stream 137 and air from system 126, each operated either intermittently or at a continuous low flow rate, thereby provide a total of four control methods for the inlet portion of FEB reactor 120.

The middle of FEB reactor 120 receives outflow 121 of mixed liquor laden with polyP bacteria and phosphate ions plus stream 135 of mixed liquor from nitrification reactor 130. As an approximation, stream 121 equals 2Q to 3Q and stream 135 equals 2Q to 4Q in volume when stream 137 is not in use. Denitrification takes place in the outlet portion of FEB reactor 120, producing nitrogen gas that escapes to the atmosphere and oxygen that is dissolved in the liquor. Fully equalized and anoxic outflow stream 123 is divided into recycle stream 125 that is fed to the inlet end of FEB reactor 120 and remainder stream 124 that is fed to nitrification reactor 130. Stream 123 equals 4Q to 7Q in volume, but stream 125 equals 1Q to 2Q, leaving stream 124, equalling 3Q to 5Q, to be fed to nitrification reactor 130.

Nitrification reactor 130 is a complete mix, activated sludge, deep aeration system, functioning mainly and preferably as a nitrification reactor, that operates within a tank having a liquid depth of 28 feet, for example. Jet recirculation pump 136, jets 139, blowers 134, and jet aeration header 138 in nitrification reactor 130 are constructed and operate as described for nitrification reactor 30.

During the aerobic cycles and when nitrification reactor 130 is operated continuously with its mixed liquor in aerobic condition, as illustrated by curve e in FIG. 6, the polyP bacteria multiply; having excess energy, they go through a "luxury uptake" of phosphate ions, converting ADP to ATP, and thereby remove phosphorus, in the form of phosphate ions, from the mixed liquor.

Reactor 130 with jet aeration and mixing is also designed to be operated while using the Sequencing Continuous Reactor (SCR) process, as disclosed in U.S. Pat. No. 4,917, 805 to John H. Reid. The SCR process design allows for cyclical high D.O./low D.O., oxic/anoxic operation of reactor 130 in order to minimize air supply blower power consumption and provide nitrification/denitrification operational capacity in the complete mix activated sludge process. The On/Off operating cycles of the centrifugal blowers are controlled by manually adjustable automatic timers set to independently control the aerobic cycle time and anoxic cycle time in the complete mix reactor. The centrifugal air supply blower controls are also designed for control by an automatic dissolved oxygen sensor/controller. Oxic/anoxic cycle times can be adjusted by changing the automatic centrifugal blower on/off timer controls. Centrifugal blower on/off times range from 20 minutes on/40 minutes off to 60 minutes on/60 minutes off. The time lengths of the oxic and anoxic cycles can be independently adjusted as an additional control method.

Nitrification reactor 130 is operated according to successive oxic/anoxic cycles. Ammonia removal occurs by biological nitrification during the oxic blower-On cycles when D.O. concentrations in the mixed liquor rise above 2.0 mg/L up to 3.0 mg/L; similarly, nitrate/nitrite removal occurs by biological denitrification during the anoxic blower-Off cycles when D.O. concentrations in the mixed liquor fall between 0.0 and 0.3 mg/L, as illustrated by curve f in FIG. 7.

First-stage nitrate/nitrite removal occurs in the anoxic half of 7-Day/24-hour equalized FEB reactor 120. Second-stage nitrate/nitrite removal occurs in nitrification reactor 130 when operated with alternating high D.O./low D.O. cycles. Reactor 130 is preferably operated with a constant high D.O. concentration of approximately 2 to 3 mg/L if only ammonia removal by nitrification is desired, as illustrated in FIG. 6.

When nitrification reactor 130 is operated continuously with its mixed liquor in aerobic condition, outflow stream 131 from reactor 130 is divided into recycle stream 133 that is fed to the middle of FEB reactor 120 and remainder stream 132 that is discharged into anoxic reactor 140, having downpumping mixer 141, for example. If BOD is temporarily inadequate, a supply of methanol can be supplied to anoxic reactor 140 as stream 142.

Discharge stream 143 is sent to mixer 150 for chemical additions. To mixer 150 a stream 151 of aluminum chloride is fed to obtain additional phosphorous removal by chemical precipitation in clarifier 160. Anionic polymer solution is also dosed into mixer 150 through line 152 to provide chemical flocculation in clarifier 160. Outflow stream 153 is fed to clarifier 160.

Activated sludge stream 161 from the bottom of clarifier 160 is divided into recycle stream 163 that is fed to nitrification reactor 130 and remainder stream 162 that is fed to aerated sludge storage tank 170. Outflow stream 171 therefrom enters waste activated sludge belt press 175 that discharges concentrated sludge 176 into trucks 180 for ultimate disposal by land application. This sludge 176 contains a large amount of phosphorus that is thereby prevented from entering lakes and streams.

Clarified liquor stream 165 passes through $Cl_2/SO_2$ disinfection unit 190 to produce clean, sanitary water stream 191, containing nitrogen and phosphorus contents below environmental requirements, for disposal in a stream or lake without harm thereto.

Figure 8A:
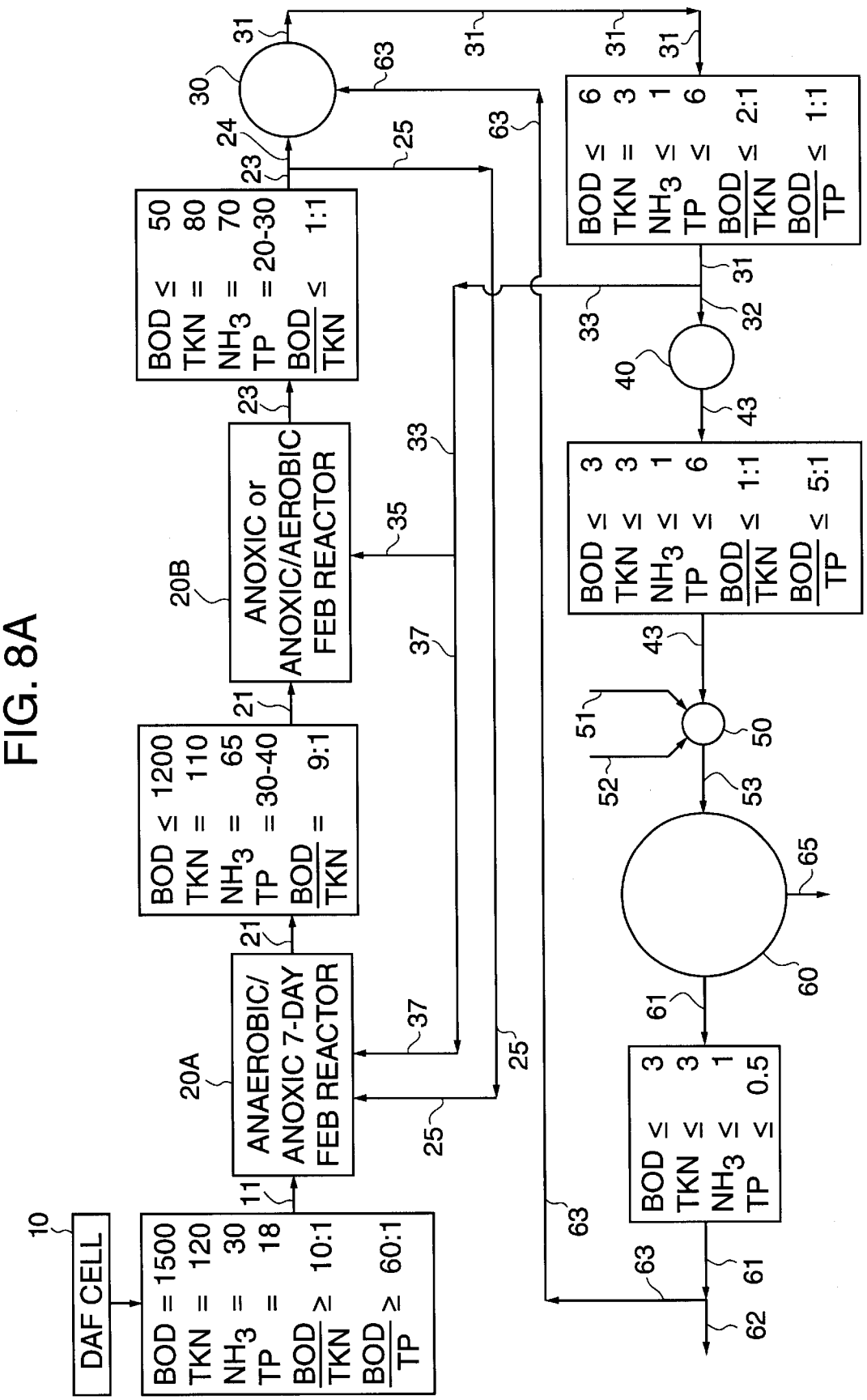
FIG. 8A is a process flow diagram based on FIG. 8 with each stream intercepted by a block that furnishes data for the soluble BOD (not the total BOD) in the supernatant liquor after settling out of biological solids from the mixed liquor in that stream, including BOD, TKN, $NH_3$, TP, the BOD/TKN ratio, and in some cases the BOD/TP ratio.
Figure 8B:
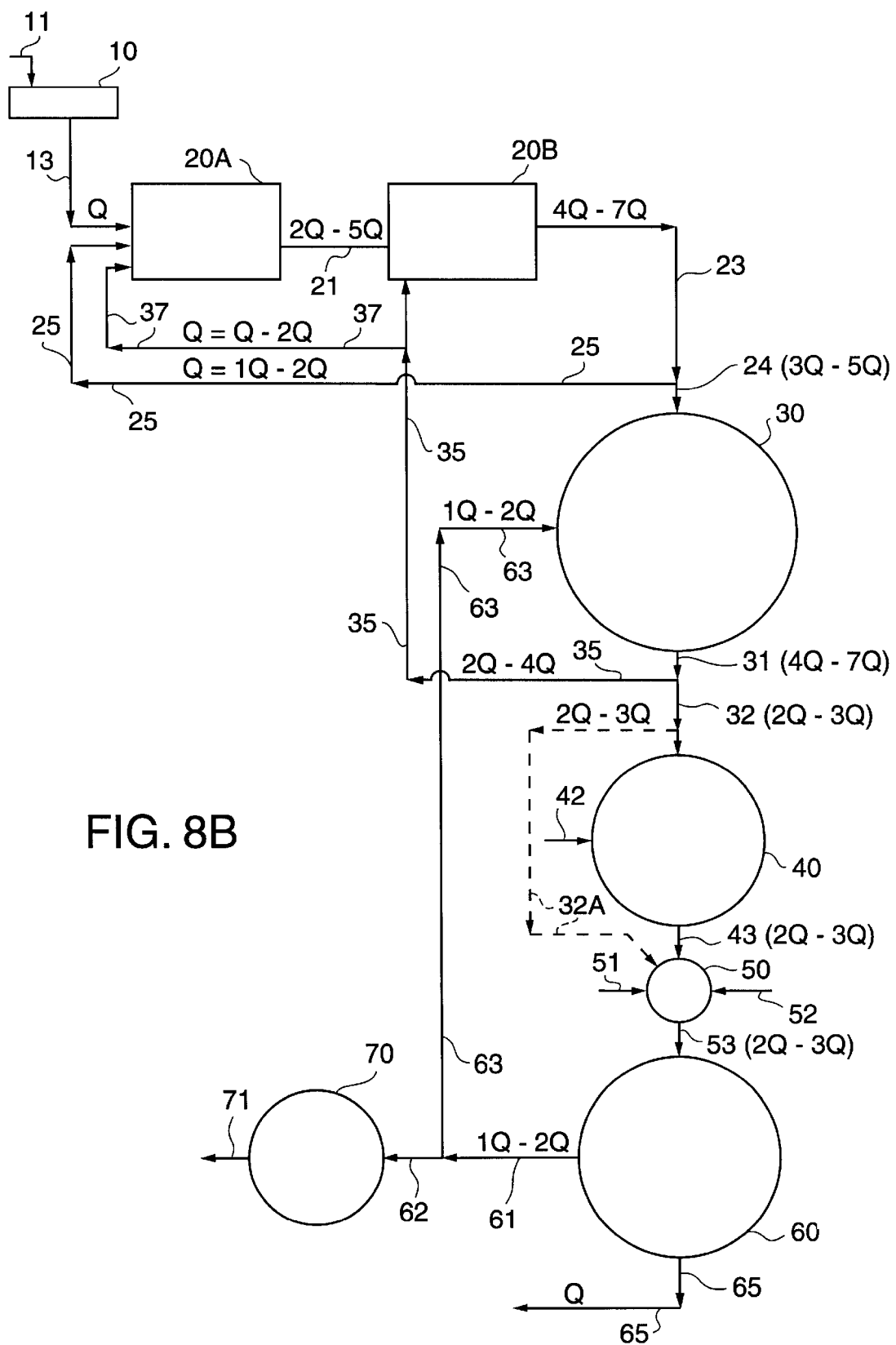
FIG. 8B is a process flow diagram based on FIG. 8 with each numbered stream accompanied by its possible range of flows expressed as multiples of Q.

Analysis of the biological performance of the instant invention as compared to flow equalizing lagoons of the prior art and their downstream treatments to remove nitrogen and minimize phosphorus discharge is available by reviewing FIG. 8A as compared to the anaerobic, facultative, and aerobic lagoons of the prior art that are shown in FIG. 1. The BOD range therein for the mixed liquors in the outflows from these types of lagoons is 100–300; the TKN range is 80–115; the $NH_3$ range is 60–90; and the TP range is 12–15.

It must be borne in mind that a BOD/TKN ratio of at least 5:1 is needed for downstream denitrifying biological treatments. Instead, these three basic lagoon types provide BOD/TKN ratios of 2.6:1 for anaerobic lagoons, 2.4:1 for facultative lagoons, and 1.3:1 for aerobic lagoons.

In clear contrast, the instant invention provides a BOD/TKN ratio of at least 9:1 in line 21 from FEB reactor 20A, so that there is an abundance of BOD as a carbon food source in FEB reactor 20B for the bacteria to reduce nitrates to nitrites and nitrites to nitrogen gas. This high BOD/TKN ratio drives the denitrification reactions to produce nitrogen gas.

It should also be borne in mind that the TKN measurement shown in FIG. 8A does not include nitrates and nitrites in the mixed liquor of stream 23 but does include $NH_3$. The nitrates and nitrites that constantly flow into FEB reactor 20B through line 35 are substantially eliminated in this reactor while its $NH_3$ content increases because of deamination, as illustrated in FIG. 3.

The BOD/TP ratio in influent stream 11 to FEB reactor 20A, as illustrated in FIG. 8A, is 83:1, exactly as in the influents to prior art lagoons. A BOD/TP ratio of at least 20:1 is needed for biological phosphorus removal. However, because the D.O. in FEB reactor 20A is controlled so as to hover in the anaerobic range while avoiding septic conditions, as illustrated in FIG. 4, this high BOD/TP ratio drives the hydrolysis of ATP to form ADP and $HPO_4^=$ ions while large amounts of VFAs are being ingested by the polyP bacteria.

Then in FEB reactor 20B, where the ratio of BOD/TP in influent stream 21 is in the range of 30–33:1, the polyP bacteria break down a portion of the nitrates and nitrites flowing in through line 35 in order to obtain D.O. and ingest some of the phosphate ions in a luxury uptake stage while increasing numerically. If plenty of BOD food were not there, these phosphate-removing reactions would not occur.

EXAMPLE

FINAL DESIGN SUMMARY OF WASTEWATER SYSTEM UTILIZING 7-DAY FLOW EQUALIZATION BASINS FOR SIMULTANEOUS ANAEROBIC AND ANOXIC TREATMENTS

A. 7-DAY FLOW EQUALIZATION BASIN ANAEROBIC AND ANOXIC REACTORS 20A and 20B. as seen in FIG. 8

1. Design Assumptions
   a. Wastewater Flows
   1) Maximum daily influent flow volume $\leq 1.30$ MGD
   2) Average daily effluent pumping rate required for 7-day hydraulic flow equalization.

$$= \frac{1.30 \; MGD(5 \; days)}{7 \; days} \leq .95 \; \text{Million Gallons per Day} \; (MGD), 7 \; \text{days/week}$$

b. Pollutant Concentrations and Loads
   1) The following influent wastewater pollutant concentrations and loads are assumed in the design of the 7-day FEB anaerobic/anoxic reactor 20A and 7-day FEB anoxic/aerobic reactor 20B at the maximum influent wastewater flow volume $\leq 1.30$ MGD, 5 days/week from upstream DAF pretreatment system 10:

| Pollutant | Pollutant Concentration | Pollutant Loadings |
|---|---|---|
| BOD | 750 mg/L | 8,131#/day |
| TSS | 200 mg/L | 2,168#/day |
| O&G | 50 mg/L | 542#/day |
| TKN | 85 mg/L | 921#/day |
| NH3-N | 50 mg/L | 542#/day |
| TP | 15 mg/L | 163#/day | c. FEB reactor 20A is designed to function as either an anaerobic (zero DO/zero nitrite)/anoxic reactor, or as an anoxic (low D.O.) reactor providing combined 7-day hydraulic flow equalization, carbonaceous BOD removal, and biological phosphorus removal. Reactor 20B is designed to function as an anoxic (low D.O.) reactor providing combined 7-day hydraulic flow equalization, carbonaceous BOD removal, and nitrate removal.
2. Equalization Volume and Tank Volume Design Calculations
   a. Maximum volume required for 7-day, 24-hour hydraulic flow equalization=(1.30 MGD–0.95 MGD) (5 days)=1.75 MG
   b. Residual volume provided in FEB reactor 20A & 20B at the 6.0 ft. low liquid depth=1.25 MG. Maximum volume provided in FEB reactor 20A & #1B at the 10.0 ft. max. liquid depth=3.0 MG.
3. 7-day FEB reactors 20A & 20B Nitrate Removal Process Design
   a. 7-day FEB reactors 20A & 20B are each constructed as a basin having bottom dimensions of 115 ft. long×115 ft. wide×10.0 ft. maximum liquid depth, with 3/1 side slopes, 1.5 MG volume (3.0 MG total volume) lined earthen lagoon.

b. 7-day FEB reactors 20A & 20B are used for 7-day hydraulic flow equalization and are also operated as anaerobic/anoxic and anoxic activated sludge reactors for biological phosphorus removal, nitrate removal, and carbonaceous BOD removal upstream from existing activated sludge final treatment systems 30, 40.

4. Reactor Design Calculations a. The volume of the 7-day FEB reactors 20A & 20B can be optionally used as activated sludge reactor basins for removal of carbonaceous BOD in the pretreated wastewater discharged from upstream DAF pretreatment cell 10, and for removal of nitrate nitrogen in the mixed liquor flow recycled from downstream nitrification reactor 30. Reactor 20A, however, is preferably operated as a anaerobic/anoxic reactor to achieve biological phosphorus removal.

b. Calculate Mixed liquor volatile suspended solids (MLVSS) and Mixed Liquor Suspended Solids (MLSS) concentrations required for carbonaceous BOD removal by biological synthesis in FEB reactors 20A & 20B @ minimum expected winter season design mixed liquor temperature=17° C.

1) For BOD removal assuming a carbonaceous BOD removal rate of 0.35 pounds of BOD/MLVSS at 17°C.:

$$\frac{8,131\# \ BOD/\text{day}}{.35} \leq 23,232\# \ MLVSS$$

c. Calculate MLVSS and MLSS concentrations required for removal of nitrate nitrogen in the mixed liquor recycled in line 35 from nitrification reactor 30.

1) Calculate the nitrate nitrogen ($NO_3$—N) in recycled mixed liquor, assuming 100% of TKN into nitrification reactor 30 is nitrified for a conservative design approach, assuming a 100% return activated sludge (RAS) recycle rate from final clarifier 60; and assuming maximum nitrate recycle flow rate=200% which=2.0 (0.95 MGD of RAS)/[2.0 (0.95 MGD of RAS)+0.95 MGD of +0.95 MGD flow rate of 1Q)]× 100=50% of the total flow rate that would be discharged from nitrification reactor 30.

$\#NO_3$—N recycled $\leq .50$ ($921\# \ TKN/\text{day}$) =

460# $NO_3$—N/day denitrified

2) For $NO_3$—N removal assuming a denitrification rate $\geq 0.06\# \ NO_3$—N/#MLVSS @ 17° C.

$$\frac{460\# \ NO3\text{—N/day}}{.06} = 7,667 \ MLVSS \ @ \ 17° \ C.$$

; therefore, #MLVSS for carbonaceous BOD removal governs the minimum biomass weight required and therefore the design MLVSS=23,232# and #MLSS=23,232#/0.85=27,331# assuming MLVSS/MLSS=0.85 d. The maximum MLSS concentrations required in FEB reactors 20A & 20 are calculated as follows at low water level (LWL) and high water level (HWL):

1) @ LWL when the effective total basin volume is approximately=1.25 MG $$MLSS = \frac{27,331\# \ MLSS}{(1.25 \ MG)(8.34)} = 2,622 \ \text{mg/L}$$

$$\leq 3,000 \ \text{mg/L}$$

2) @ HWL when the effective anoxic basin volume is approximately 3.0 MG $$MLSS = \frac{27,331\# \ MLSS}{(3.0 \ MG)(8.34)} = 1,093 \ \text{mg/L}$$

$$\leq 1,500 \ \text{mg/L}$$

e. Calculate the hydraulic detention time (HDT) in FEB reactors 20A & 20B at LWL and HWL, assuming the total flow volume into the anoxic reactors=inflow rate+ 2Q nitrate mixed liquor recycle flow rate=1.30 MGD+ 2(0.95 MGD)=3.20 MGD total inflow rate=2,220 gpm 1) $HDT = \dfrac{1,250,000 \ \text{gallons}}{2,220 \ \text{gpm}} = 563 \ \text{min.} \ @ \ LWL$ $= 9.4 \ \text{hours} \ @ \ LWL$ 2) $HDT = \dfrac{3,000,000 \ \text{gallons}}{2,220 \ \text{gpm}} = 1351 \ \text{min.} \ @ \ HWL$ $= 22.5 \ \text{hours} \ @ \ HWL$ 5. 7-day FEB reactors 20A & 20B Mixing and Aeration Equipment Design a. Evaluate Mixing and Aeration requirements in 7-day Flow Equalization Basin reactors 20A & 20B.

1) bhp required for mixing 1,500 mg/L to 3,000 mg/L TSS concentration=20 HP/MG with downpumping floating mixers 28, 29 at depths ranging from 6.0 ft. @ LWL to 10.0 ft. @ HWL; average volume=2.125 MG total=1.0625 MG/reactor and maximum volume=3.0 MG total=1.5 MG/reactor.

2) bhp required=20 HP (1.5)$\leq$37.5 HP @ HWL Mixing to be provided by one 40-HP floating down pumping mixer 28, 29 in each FEB reactor 20A & 20B.

3) Calculate the average oxygen transfer requirement in 7-day FEB reactors 20A & 20B:

$$AOTR \leq \frac{.75\#02/\#BOD(8,131\# \ BOD/\text{day})}{24 \ \text{hrs/day}}$$

$$= 237\# \ O_2/\text{hr}$$

b. Calculate the oxygen available in recycled nitrate through line 35 for carbonaceous BOD removal in FEB reactor 20B, assuming a nitrogen uptake by the biomass of approximately 3 mg/L of N/100 mg/L (750 mg/L BOD×0.03)=22.5 mg/L=244#$O_2$/day at 1.3 MGD inflow rate (line 13), assuming>_2.75#$O_2$ available/ $\#NO_3$—N denitrified; and assuming$\geq$200% nitrate recycle rate=50% of the flow discharged from nitrification reactor 30:

$\#O_2/\text{hr}$ available from $NO_3$—N

-continued $$= \frac{(921\# \; TKN/\text{day} - 244\# \; N/\text{day})2.75\,(.50)}{24}$$

$= 38\# \; O_2/\text{hr}$ c. Calculate the net average amount of oxygen required in 7-day FEB reactors 20A & 20B=237#/hr −38#/hr= 199#/hr≦200#/hr d. Oxygen transfer in 7-day FEB reactors 20A & 20B are provided by air-grid coarse bubble diffused aeration headers 26 installed approximately 1.0 ft. above the basin floor. Mixing will be provided in FEB reactors 20A & 20B by operation of two 40-HP floating mixers 29, 29 in each FEB reactor. The air sparging capacity of the coarse bubble diffuser system 26 is approximately 5,600 scfm, providing an oxygen transfer rate of>200#$O_2$/hr (AOTR) with air supplied by three 75-HP (62 bhp) positive displacement blowers 27, each rated at 1,867 scfm at 5.5 psi. These positive displacement blowers 27 are cyclically operated to control the supply of compressed air for oxygen transfer. Air supply blowers 27 are automatically and cyclically operated to control the dissolved oxygen concentration in FEB reactors 20A & 20B to maintain anoxic conditions and thereby achieve denitrification of nitrate oxygen recycled to 7-day FEB reactor 20B from nitrification reactor 30 through line 35.

e. Oxygen in Anoxic Activated Sludge FEB reactor 20B is normally provided by nitrate oxygen contained in the mixed liquor recycled by gravity through line 35 from downstream nitrification reactor 30. Air supply blowers 27 and coarse bubble diffusers 26 are operated as requested to provide a low D.O. concentration and prevent odors.

6. Expected Effluent quality at the Maximum Daily 7-Day Discharge Flow Volume=0.95 MGD a. To insure a conservative design approach due to large liquid level variations required in 7-day FEB reactors 20A & 20B to accomplish 7-day hydraulic flow equalization, the following effluent pollutant concentrations in FEB reactor 20B are assumed in the pretreated wastewater pumped into the downstream nitrification and denitrification reactors 30, 40:

| Pollutant | Concentration | Loading |
|---|---|---|
| BOD ≦ | 250 mg/L | ≦2,000#/day |
| O&G ≦ | 10 to 30 mg/L | ≦238#/day |
| TKN ≦ | 50 to 75 mg/L | ≦600#/day |
| NH3-N ≦ | 45 to 70 mg/L | ≦550#/day |
| TP ≦ | 10 to 15 mg/L | ≦120#/day |

B. 7-DAY FEB REACTOR 20B EFFLUENT PUMP STATION

1. Design Assumptions
    a. Maximum Wastewater Flow Rate=Q=0.95 MGD=660 gallons per minute (gpm), 24 hours/day, 7 days/week
    b. Maximum Nitrate Recycle Flow Rate=200%=2Q=1.9 MGD=1,320 gpm, 24 hours/day, 7 days/week
    c. Maximum Total Pumping Rate Required=3Q=2.85 MGD=2,000 gpm, 24 hours/day, 7 days/week
2. Pump Selection
    a. Three constant-speed drive self-priming sewage pumps (not shown in FIG. 8) are provided in the 7-day FEB reactor 20B Effluent Pump Station. Each pump is rated at a flow capacity=1.5Q=1,000 gpm @ 60 feet. Operation of two pumps in parallel is required to pump the average total flow rate into nitrification reactor 30 through lines 23, 24.
    b. Operation of two pumps in parallel can provide a total flow rate of up to 3Q=2.85 MGD=2,000 gpm. The third pump is provided as an installed standby. Operation of the three pumps in parallel can be used if a nitrate recycle rate greater than 200% (2Q) is desired.
    c. Each of the self-priming sewage pumps is rated at a flow capacity=1.425Q=1,000 gpm @ 60 feet and can be manually throttled to pump between 1.0Q to 1.425Q flow rate from FEB reactor 20B to nitrification reactor 30.

While operating a treatment system in the eastern United States for wastewater produced in a poultry slaughtering operation operating 2–5 days per week on a single shift per day that handled 180,000 birds per shift (Case 3 as described hereinbefore), an aluminum chloride dosage rate of approximately 385 gallons per day (gpd) was required to reduce total phosphorus concentrations from an average of 15.2 ng/L down to less than 1.0 mg/L, thereby providing approximately 94% phosphorus removal efficiency.

After start-up of 7-day FEB reactors 20A & 20B, the average final effluent total phosphorus (TP) concentration dropped to below 0.35 mg/L, providing approximately 98% phosphorus removal, while the required aluminum chloride dosage also dropped by 50% to approximately 190 gpd. This significant reduction in final effluent TP concentration and in aluminum chloride dosage requirement are attributable to luxury biological phosphorous removal after June 1999 that was obtained by anaerobic/anoxic operation of 7-day FEB reactor 20A followed by anoxic operation of 7-day FEB reactor 20B and aerobic/anoxic operation of nitrification reactor 30 (anoxic reactor 40 had not yet been put into operation).

The multi-stage activated sludge wastewater treatment system of this invention has consistently achieved 99.2% BOD removal, 99.4% ammonia nitrogen removal, 90% total nitrogen removal, and 94% total phosphorous removal during August and September 1999. This high efficiency total nitrogen removal was achieved without methanol dosage.

It will be appreciated by those skilled in the wastewater treatment art that various modifications of the FEB reactor or reactors and the biological control methods therefor may be employed, but the scope and principles of the invention should be understood in accordance with the following claims.

What is claimed is:

1. A method of utilizing a wastewater flow equalization basin (FEB) as an FEB reactor for multiple biological treatments of inflowing proteinaceous processing wastewater containing BOD by converting said wastewater to mixed liquor and controlling dissolved oxygen (D.O.) levels in said mixed liquor while consuming conventional amounts of said BOD, said multiple biological treatments comprising deamination of proteins to form ammonia, hydrolysis of adenosine triphosphate (ATP) to form adenosine diphosphate (ADP) while releasing phosphate ions and energy and ingesting volatile fatty acids (VFAs) by polyP bacteria, and denitrification of recycled nitrates and nitrites.

2. The method of claim 1, wherein said FEB reactor is divided into an inflow portion and an outflow portion, receives an inflow stream of said wastewater in said inflow portion, and produces a 7-day and 24-hour equalized outflow stream from said outflow portion that is divided into a first recycle stream and a first remainder stream, said first recycle stream being fed to said inflow portion to produce mixed liquor therein and said first remainder stream being fed to a nitrification reactor that produces nitrates and nitrites.

3. The method of claim 2, wherein said FEB reactor is operated within said inflow portion as an anaerobic/anoxic reactor and is operated within said outflow portion as an anoxic/aerobic reactor.

4. The method of claim 3, wherein said nitrification reactor produces an outflow stream, containing said nitrates and nitrites, that is divided into a second recycle stream and a second remainder stream, said second recycle stream being fed to said outflow portion of said FEB reactor and said second remainder stream being fed to an anoxic reactor, containing a mixer, for denitrifying said nitrates and nitrites.

5. The method of utilizing an FEB reactor, having an inflow portion and an outflow portion, to perform multiple biological reactions, in addition to equalizing 2-to-6-day nitrogenous food processing plant wastewater inflow to said FEB reactor to produce uniform 7-day/24-hour outflow, said wastewater having high biological oxygen demand (BOD), comprising the following steps for performing said reactions:
   A) admixing recycled and denitrified mixed liquor with said wastewater within said inflow portion of said FEB reactor;
   B) maintaining anaerobic/anoxic conditions in said mixed liquor within said inflow portion in the absence of nitrites and nitrates to obtain release of energy and phosphate ions by polyP bacteria that hydrolyze adenosine triphosphate (ATP) and form adenosine diphosphate (ADP) while polymerizing a substrate of organic compounds for intracellular storage;
   C) admixing recycled mixed liquor containing nitrite and nitrate ions within said outflow portion; and
   D) maintaining anoxic conditions in said mixed liquor within said outflow portion to obtain denitrification of said nitrites and nitrates and release of nitrogen as gas, whereby a portion of said BOD is consumed for performing said reactions.

6. The method of claim 5, wherein said anaerobic conditions are defined as dissolved oxygen (D.O.) being between 0.0 and 0.15 mg/L and nitrate ions being less than 2 mg/L in recycled mixed liquor, said anoxic conditions are defined as D.O. being between 0.1 and 0.3 mg/L of mixed liquor, and aerobic conditions are defined as D.O. being between 1.0 and 3.0 mg/L of mixed liquor.

7. The method of claim 6, wherein:
   A) said inflow portion is a first FEB reactor;
   B) said outflow portion is a second FEB reactor connected in series with and downstream from said first FEB reactor; and
   C) outflow of denitrified mixed liquor from said second FEB reactor is said uniform 7-day/24-hour outflow and is fed:
      1) partially to said first FEB reactor as said recycled and denitrified mixed liquor of said step A of claim 1, and
      2) partially to a downstream nitrification reactor.

8. The method of claim 7, wherein said 2-to-6-day nitrogenous food processing plant wastewater inflow is defined as $Q_5$, and wherein when said $Q_5$ is equalized over 24 hours and 7 days, said uniform 7-day/24-hour outflow is defined as $Q_7$ that is herein identified as Q.

9. The method of claim 8, wherein said recycled and denitrified mixed liquor of said step A of claim 1 is 50–200% of said Q.

10. The method of claim 9, wherein said nitrification reactor is operated under said aerobic conditions in order to:
   A) nitrify ammonia that is produced by deamination of proteins in said wastewater inflow to produce nitrites and nitrates from said ammonia; and
   B) enable said polyP bacteria to utilize said substrate of organic compounds for multiplying while ingesting said phosphate ions on a "luxury" basis.

11. The method of claim 10, wherein:
   A) nitrite/nitrate-containing outflow from said nitrification reactor is divided into a nitrified recycle portion and a nitrified downstream portion; and
   B) said nitrified recycle portion, being within the range of 200% to at least 400% of said Q, is fed to said second FEB reactor as said recycled mixed liquor containing said nitrite and nitrate ions of said step C) of claim 5.

12. The method of claim 11, wherein a subportion of said nitrified recycle portion, within the range of 0 to 200% of said Q, is selectively fed to said first FEB reactor in order to maintain said D.O. under said anaerobic conditions.

13. The method of claim 12, wherein said nitrified downstream portion is within the range of 200% to 300% of said Q and is fed to a clarifier wherein clarified liquor and activated sludge are produced.

14. The method of claim 13, wherein said activated sludge is divided into a sludge recycle portion that is fed to said nitrification reactor and a sludge remainder portion, said sludge recycle portion being within the range of 100% to 200% of said Q.

15. The method of claim 14, wherein an anoxic reactor is interposed between said nitrification reactor and said clarifier, whereby said nitrified remainder portion is fed to said anoxic reactor in which anoxic conditions cause denitrification of said nitrified remainder portion to produce a denitrified outflow that is fed to said clarifier.

16. The method of claim 15, wherein a mixer is interposed between said anoxic reactor and said clarifier for selectively admixing ionic polymer and aluminum chloride with said denitrified outflow for producing an admixed outflow that is fed to said clarifier.

17. A method of using a wastewater flow equalization basin (FEB) as an FEB reactor for multiple biological treatments of inflowing proteinaceous processing wastewater containing BOD by converting said wastewater to mixed liquor and controlling dissolved oxygen (D.O.) levels in said mixed liquor within said FEB reactor while utilizing said BOD for said multiple biological treatments by polyP and denitrifying bacteria, while other bacteria deaminate proteins in said wastewater to form ammonia.

18. The method of claim 17, wherein said multiple biological treatments comprise:
   A) hydrolysis of adenosine triphosphate (ATP) to form adenosine diphosphate (ADP) by said polyP bacteria while releasing phosphate ions and energy and polymerizing a substrate of organic compounds for intracellular storage;
   B) production of ammonia by deamination of proteins in said proteinaceous wastewater; and
   C) denitrification of recycled nitrates and nitrites to form nitrogen gas.

19. The method of claim 17, wherein said FEB reactor is divided into an inflow half and an outflow half, receives said inflowing proteinaceous processing wastewater in said inflow half, and produces a 7-day and 24-hour equalized outflow stream from said outflow half that is divided into a first recycle stream and a first remainder stream, said first recycle stream being fed to said inflow half to produce mixed liquor therein and said first remainder stream being fed to a nitrification reactor that produces said nitrates and nitrites from said ammonia.

20. The method of claim 19, wherein said FEB reactor is operated within said inflow half as an anaerobic/anoxic reactor and is operated within said outflow half as an anoxic/aerobic reactor.

21. The method of claim 20, wherein said nitrification reactor produces an outflow stream, containing said nitrates and nitrites, that is divided into a second recycle stream and a second remainder stream, said second recycle stream being fed to said outflow half of said FEB reactor and said second remainder stream being fed to an anoxic reactor, containing a mixer, for denitrifying said nitrates and nitrites.

22. The method of claim 21, wherein said anoxic reactor produces an outflow stream that is admixed with a chemical to complete the precipitation of phosphorus as sludge and wherein the quantity of said chemical that is needed is reduced by at least 50% by operation of said FEB reactor.

23. The method of claim 22, wherein said admixing produces an admixed outflow stream that is fed to a clarifier which produces an activated sludge stream that is partially recycled to said nitrification reactor for creating mixed liquor therein.

24. The method of claim 23, wherein said inflow half is equipped with a plurality of floating downpumping mixers and a diffused aeration system that may be cycled on and off to provide cyclical oxygen transfer into said FEB reactor according to automatic timer controls as a first control method for said controlling of said D.O. levels.

25. The method of claim 24, wherein said first recycle stream may be varied in quantity as a second control method for said controlling of said D.O. levels.

26. The method of claim 25, wherein said second recycle stream may be varied in quantity as a third control method for said controlling of said D.O. levels.

27. The method of claim 26, wherein a third recycle stream may be selectively and variably removed from said second recycle stream and fed to said inflow half as a fourth control method for said controlling of said D.O. levels and for preventing said anaerobic/anoxic inflow half of said FEB reactor from becoming septic.

28. The method of claim 27, wherein said polyP bacteria within said anaerobic/anoxic inflow half of said FEB reactor discharge phosphate ions and use the energy released thereby to take up volatile fatty acids (VFAs) derived by deamination from said proteinaceous wastewater.

29. The method of claim 28, wherein additional species of bacteria within said anoxic/aerobic outflow half of said FEB reactor convert nitrate and nitrite ions to nitrogen gas while utilizing oxygen ions as an electron acceptor.

30. The method of claim 21, wherein said second recycle stream equals 200% to 400% of said Q, whereby 50% to 70% of said nitrate/nitrite ions produced in said nitrification reactor is recycled to said FEB reactor.

31. The method of claim 19, wherein said mixed liquor in said nitrification reactor is maintained in selectively cycled aerobic and anoxic states, said mixed liquor in said aerobic state containing more than 0.3 mg/l of dissolved oxygen so that another species of bacteria consumes a portion of said BOD in said mixed liquor and produces said nitrate/nitrite ions from ammonia, said mixed liquor in said anoxic state containing 0.1 to 0.3 mg/L of oxygen so that denitrifying bacteria in said mixed liquor consume an additional portion of said BOD while breaking down said nitrate/nitrite ions to nitrogen gas.

32. A method for biological treatment of wastewater, containing proteinaceous materials from an animal slaughtering plant after fat, oil, and grease have been removed from said wastewater, comprising the following steps for multiple biological treatments of said wastewater within a sequence of flow equalization basins that equalize inflow from 2 to 6 days of operation of said plant per week to substantially uniform outflow during 24 hours per day for seven days per week, comprising the following steps:

A) operating a first flow equalization basin as a first FEB reactor wherein mixed liquor is formed therein and dissolved oxygen therein is controlled to be between anaerobic and anoxic states for hydrolysis of adenosine tripolyphosphate to adenosine diphosphate and liberation of both phosphate ions and energy by polyP bacteria;

B) operating a second flow equalization basin as a second FEB reactor wherein dissolved oxygen therein is controlled to be at said anoxic state for denitrification of nitrites and nitrates within said mixed liquor to form nitrogen gas;

C) delivering a remainder portion of said substantially uniform outflow from said second FEB reactor to a nitrification reactor and operating said nitrification reactor under aerobic conditions to nitrify ammonia formed by deamination within said wastewater for producing said nitrites and nitrates and to enable said polyP bacteria to ingest said phosphate ions at a luxury uptake rate while multiplying in numbers, thereby producing nitrite/nitrate liquor; and D) delivering a recycle portion of said substantially uniform outflow from said second FEB reactor to said first FEB reactor to form mixed liquor therein; and E) recycling a portion of said nitrite/nitrate liquor from said nitrification reactor to said second FEB reactor.

33. A method of enabling a flow equalization basin, comprising an inflow half and an outflow half, to be simultaneously utilized as an FEB reactor for flow equalizing, biological release of phosphate ions and intake of volatile fatty acids (VFAs) by polyP bacteria, and selectively limited removal of biological oxygen demand when said inflow half of said FEB reactor is operated on an anaerobic/anoxic basis and when said outflow half is operated on an anoxic/aerobic basis and is followed by an nitrification reactor, comprising the following control steps:

A) feeding an inflow stream of protein-containing effluent liquor from a food processing plant that is operated on a 2-to-6-day basis to said inflow half of said FEB reactor;

B) controllably recycling a stream of nitrified mixed liquor containing nitrites and nitrates from said nitrification reactor into a recycle portion and a downstream portion and feeding said recycle portion to said outflow half of said FEB reactor;

C) controllably dividing an outflow stream of denitrified mixed liquor from said outflow half, said outflow stream being substantially uniform in quantity for 24 hours per day and seven days per week, whereby said flow equalizing is provided, into a recycle portion and a remainder portion; and D) feeding said recycle portion to said inflow half of said FEB reactor.

34. The method of claim 33, wherein a selected subportion of said nitrified mixed liquor stream of said Step B is controllably recycled to said inflow half of said FEB reactor during unusual weather conditions.

35. The method of claim 34, wherein, as an additional control step, said FEB reactor is provided with an aeration system that can be cycled on and off to provide cyclical oxygen transfer into said FEB reactor according to automatic timer controls during said unusual weather conditions.

36. The method of claim 35, wherein, as a further control step, said nitrification reactor is provided with an aeration system that can be selectively throttled and cycled on and off to provide cyclical oxygen transfer into said nitrification reactor.

37. The method of claim 33, wherein:
  A) said nitrification reactor is operated continuously under aerobic conditions;
  B) an anoxic reactor is provided downstream of said nitrification reactor, and
  C) said downstream portion of said step B is fed thereto, whereby substantially all remaining nitrates and nitrites are denitrified in the outflow stream from said anoxic reactor.

38. The method of claim 37, wherein said 2-to-6-day nitrogenous food processing plant wastewater inflow is defined as $Q_5$, and wherein when said $Q_5$ is equalized over 24 hours and 7 days, said uniform 7-day/24-hour outflow is defined as $Q_7$ that is herein identified as Q.

39. The method of claim 38, wherein a carbon source is added to said outflow stream from said anoxic reactor whenever remaining BOD is no longer adequate.

40. The method of claim 39, wherein said recycle stream of denitrified mixed liquor from said nitrification reactor equals 200% to 400% of said Q, whereby 50% to 70% of said nitrate produced in said nitrification reactor is recycled.

41. The method of claim 40, wherein said downstream portion from said nitrification reactor is admixed with a chemical to complete the precipitation of phosphorus as sludge, and the quantity of said chemical that is needed is reduced by more than 50% by operation of said FEB reactor.

42. In a conventional flow equalization lagoon which equalizes 2-to-6-day inflow to said lagoon of nitrogenous food processing plant wastewater, having high biological oxygen demand (BOD), to produce uniform 7-day/24-hour outflow, the improvement that enables multiple biological reactions to be performed therein that consume normal amounts of said BOD and enhance phosphorus and nitrogen removal from said wastewater, comprising the following steps:

A) dividing said lagoon into two separately mixed portions which operated as a first FEB (Flow Equalization Basin) reactor and a second FEB reactor, said first FEB reactor receiving said inflow and said second FEB reactor receiving outflow from said first FEB reactor;

B) partially recycling denitrified mixed liquor, as uniform 7-day/24-hour outflow from said second FEB reactor, to said first FEB reactor to produce mixed liquor therein and feeding remaining said outflow to a nitrification reactor that also receives activated sludge from a downstream clarifier;

C) maintaining said nitrification reactor under aerobic conditions in its supernatant liquor for:
  1) enabling polyP bacteria in its mixed liquor to multiply, by utilizing a polymerized substrate of organic compounds stored intracellularly, and to ingest phosphate ions on a luxury uptake basis; and
  2) nitrifying ammonia, created by deamination of proteins in said inflow, to produce nitrified mixed liquor that is separated into a recycle stream and a remainder stream, said recycle stream being fed to said second FEB reactor and said remainder stream being fed to an anoxic reactor;

D) maintaining said first FEB reactor under anaerobic/anoxic conditions in its mixed liquor, whereby said polyP bacteria therein hydrolyze adenosine triphosphate (ATP) and form adenosine diphosphate (ADP) while polymerizing Volatile Fatty Acids (VFAS) to form said substrate of said organic compounds for intracellular storage and releasing said phosphate ions; and E) maintaining said second FEB reactor under anoxic or anoxic/aerobic conditions in its nixed liquor, whereby nitrates and nitrites in said nitrified mixed liquor are reduced to release nitrogen gas and form said denitrified mixed liquor.

\* \* \* \* \*